(12) United States Patent
Toume et al.

(10) Patent No.: US 7,447,863 B2
(45) Date of Patent: Nov. 4, 2008

(54) STORAGE RESOURCE MANAGEMENT SYSTEM, METHOD, AND COMPUTER FOR DIVIDING VOLUMES BASED ON PRIORITY, NECESSARY CAPACITY AND VOLUME CHARACTERISTICS

(75) Inventors: Naotsugu Toume, Yokohama (JP);
Nobuo Beniyama, Yokohama (JP);
Kiyoshi Tanabe, Ebina (JP)

(73) Assignee: Hitachi, Ltd., Tokyo (JP)

( * ) Notice: Subject to any disclaimer, the term of this patent is extended or adjusted under 35 U.S.C. 154(b) by 216 days.

(21) Appl. No.: 11/480,372

(22) Filed: Jul. 5, 2006

(65) Prior Publication Data
US 2007/0255922 A1 Nov. 1, 2007

(30) Foreign Application Priority Data
May 1, 2006 (JP) .............................. 2006-127498

(51) Int. Cl.
*G06F 12/00* (2006.01)
*G06F 13/00* (2006.01)
(52) U.S. Cl. ...................................... 711/170; 711/112
(58) Field of Classification Search ......... 711/170–173, 711/112
See application file for complete search history.

(56) References Cited

U.S. PATENT DOCUMENTS

2004/0078644 A1* 4/2004 Fujibayashi et al. ............ 714/6
2004/0210726 A1* 10/2004 Nishikawa et al. .......... 711/154
2006/0173904 A1* 8/2006 Nakajima .................... 707/102

FOREIGN PATENT DOCUMENTS

| JP | 2002-222061 | 8/2002 |
|---|---|---|
| JP | 2003-216460 | 7/2003 |
| JP | 2003-345522 | 12/2003 |
| JP | 2004-334561 | 11/2004 |
| JP | 2006-031668 | 2/2006 |

* cited by examiner

*Primary Examiner*—Hong Kim
(74) *Attorney, Agent, or Firm*—Antonelli, Terry, Stout & Kraus, LLP.

(57) ABSTRACT

A storage resource management system includes a storage apparatus having one or more pieces of volumes and a management computer. The management computer holds volume characteristic information and use field sort volume information. The management computer executes a single use field portion allocating sequence for allocating the use fields to volumes having volume characteristics suitable for a single use field from volume characteristics described in the use field sort volume information, and also, executes a plural use fields common portion allocating sequence for allocating volumes having volume characteristics suitable for the plural use fields to any use field. Since the sequences are executed by the management computer, such a use field sort volume allocation information is formed which has described that one use field in maximum is allocated to the volume, namely one use field is allocated thereto, or none of these use fields is allocated to the volume.

18 Claims, 31 Drawing Sheets

FIG. 3

140 USE FIELD SORT STORAGE RESOURCE PORTFOLIO

150 USE FIELD SORT VOLUME CAPACITY LIST

| USE FIELD | STATUS | NECESSARY CAPACITY(GB) | ALLOCATED CAPACITY(GB) | DIFFERENCE (GB) | DIFFERENCE IN IDEAL RANGE(GB) | CONTENT OF COINCIDENT DEGREE(GB) | | |
|---|---|---|---|---|---|---|---|---|
| | | | | | | IDEAL | SUBSTITUTION | PERMISSION |
| ENTERPRISE | SHORTAGE | 100 | 80 | -20 | -20 | 80 | 0 | 0 |
| MAIL | PERMISSION | 100 | 150 | +50 | -100 | 0 | 0 | 150 |
| ARCHIVE | IDEAL | 200 | 250 | +50 | +50 | 250 | 0 | 0 |

151　152　153　154　155　156　157　158a　158b　158c　158

160 EXTRA VOLUME CAPACITY LIST

| USE FIELD | SUBSTITUTION (GB) | PERMISSION (GB) |
|---|---|---|
| ENTERPRISE | 0 | 0 |
| MAIL | 0 | 150 |
| ARCHIVE | 0 | 0 |
| ITEM WHICH IS NOT COINCIDENT WITH ANY USE FIELD | | 0 |

161　162　163　164

200 STORAGE GROUP DEFINITION TABLE

| STORAGE GROUP | CONDITION |
|---|---|
| ENTERPRISE | STORAGE NAME="High End" AND VOLUME NUMBER=100 |
| MAIL | STORAGE NAME="Middle Ravge" AND VOLUME NUMBER=200 |
| ARCHIVE | STORAGE NAME="Low Cost" AND VOLUME NUMBER=300 |

100 USE FIELD SORT VOLUME PROFILE 106 COINCIDENT DEGREE

| USE FIELD | NECESSARY CAPACITY (GB) | PRIORITY DEGREE | CAPACITY UNIT PRICE (¥/GB) | | | RESPONSE TIME (ms) | | | ... |
| --- | --- | --- | --- | --- | --- | --- | --- | --- | --- |
| | | | IDEAL | SUBSTITUTION | PERMISSION | IDEAL | SUBSTITUTION | PERMISSION | |
| ENTERPRISE | 100 | 1 | (ARBITRARY) | (ARBITRARY) | (ARBITRARY) | 0~100 | 0~100 | 0~250 | |
| MAIL | 100 | 2 | 500~1500 | 0~2000 | 0~2000 | 50~500 | 0~500 | 0~800 | |
| ARCHIVE | 200 | 3 | 0~1000 | 0~1000 | 0~1500 | 300~1000 | 0~1000 | 0~1000 | (ARBITRARY) |

101  102  103  104  105

110 USE FIELD SORT VOLUME ALLOCATION POLICY TABLE

| DIVIDING METHOD OF COMMON PORTION | DIVISION RANGE |
| --- | --- |
| EQUI-DIVIDE | ENTIRE STORAGE |

411  412

120 VOLUME CHARACTERISTIC TABLE

| STORAGE APPARATUS NAME | VOLUME NUMBER | CAPACITY (GB) | STATUS | CAPACITY UNIT PRICE (¥/GB) | RESPONSE TIME (ms) |
| --- | --- | --- | --- | --- | --- |
| HIGH END | 100 | 80 | UNDER USE | 2500 | 50 |
| MIDDLE RANGE | 200 | 150 | UNUSED | 800 | 600 |
| MIDDLE RANGE | 210 | 150 | UNUSED | 800 | 600 |
| LOW COST | 300 | 250 | UNUSED | 500 | 900 |

500 USE FIELD SORT VOLUME ALLOCATION LIST

| 501 | 502 | 503 | 504 | 505 | 506 |
|---|---|---|---|---|---|
| STORAGE APPARATUS NAME | VOLUME NUMBER | CAPACITY (GB) | USE FIELD | ALLOCATED STATUS | COINCIDENT DEGREE |
| HIGH END | 100 | 80 | ENTERPRISE | ALLOCATED | IDEAL |
| MIDDLE RANGE | 200 | 150 | MAIL | ALLOCATED | PERMISSION |
| MIDDLE RANGE | 210 | 150 | MAIL | EXTRA | PERMISSION |
| LOW COST | 300 | 250 | ARCHIVE | ALLOCATED | IDEAL |

FIG.26

1900 STORAGE APPARATUS CHARACTERISTIC TABLE

| STORAGE APPARATUS MODEL NUMBER (1901) | RAID STRUCTURE (1902) | CAPACITY UNIT PRICE (¥/GB) (1903) | RESPONSE TIME (ms) (1904) | ... |
|---|---|---|---|---|
| APPARATUS A | RAID1(4D+4D) | 2500 | 50 | |
| APPARATUS A | RAID5(3D+1P) | 1800 | 150 | |
| APPARATUS B | RAID1(2D+2D) | 2000 | 80 | |
| APPARATUS C | RAID1(2D+2D) | 1000 | 200 | |

FIG.30 PRIOR ART

200 STORAGE GROUP DEFINITION TABLE

| 201 STORAGE GROUP | 202 CONDITION |
|---|---|
| ENTERPRISE | RESPONSE TIME=0~100 |
| MAIL | CAPACITY UNIT PRICE=500~1500 AND RESPONSE TIME=50~800 |
| ARCHIVE | CAPACITY UNIT PRICE=0~1000 AND RESPONSE TIME=300~1000 |

120 VOLUME CHARACTERISTIC TABLE

| 121 STORAGE APPARATUS NAME | 122 VOLUME NUMBER | 123 CAPACITY (GB) | 124 STATUS | 125 CAPACITY UNIT PRICE (¥/GB) | 126 RESPONSE TIME (ms) |
|---|---|---|---|---|---|
| HIGH END | 100 | 80 | UNDER USE | 2500 | 50 |
| MIDDLE RANGE | 200 | 150 | UNUSED | 800 | 600 |
| MIDDLE RANGE | 210 | 150 | UNUSED | 800 | 600 |
| LOW COST | 300 | 250 | UNUSED | 500 | 900 |

... 121a, 121b, 121c, 121d

S220 STORAGE GROUP MANAGING PROCESS

210 STORAGE GROUP LIST

| 211 STORAGE GROUP | 212 TOTAL CAPACITY (GB) |
|---|---|
| ENTERPRISE | 80 |
| MAIL | 300 |
| ARCHIVE | 550 |

STORAGE RESOURCE MANAGEMENT SYSTEM, METHOD, AND COMPUTER FOR DIVIDING VOLUMES BASED ON PRIORITY, NECESSARY CAPACITY AND VOLUME CHARACTERISTICS

INCORPORATION BY REFERENCE

The present application claims priority from Japanese application JP2006-127498 filed on May 1, 2006, the content of which is hereby incorporated by reference into this application.

BACKGROUND OF THE INVENTION

The present invention generally relates to a storage system for managing storage apparatus. More specifically, the present invention is directed to a technical idea capable of dividing, or analyzing storage areas (storage resources) based upon use field sorts, which are provided by the storage system.

Storage systems are arranged by storage apparatus which are connected to each other via, for example, an SAN (Storage Area Network). A storage apparatus (will also be referred to as "disk array sub-system") provides storage areas to application programs in a logic unit called as a volume. Very recently, such storage systems have been made more complex and in very large scales, while having the below-mentioned features:

(a) Various sorts/various modes of storage apparatus have been mixed with each other, the performance, reliability, cost, and vendors of which are different from each other.

(b) Evaluation metrics indicative of characteristic of volumes owns various sorts/various modes (response times, transfer speeds, RAID (Redundant Arrays of Inexpensive Disks) structures, capacity unit prices etc.).

In the above-explained complex and large-scaled storage systems, hierarchical storage managing techniques, managing techniques based upon policies, and the like have been provided as techniques capable of managing storage resources. These technical ideas correspond to such techniques capable of subdividing storage resources for management purposes based upon characteristics such as performance and cost, which are required for storage apparatus, RAID structures, and storage resources. The conventional technical ideas related to the above-explained hierarchical storage managing techniques are described in, for instance, JP-A-2003-216460, JP-A-2006-31668, and JP-A-2003-345522. The conventional technical ideas related to the above-described managing techniques based upon the policies are disclosed in, for example, JP-A-2004-334561 and JP-A-2002-222061.

FIG. 30 is a diagram for showing process flow operations for forming a storage group list in the conventional technique. In this flow diagram, characteristics of volumes belonging to respective storage groups have been described in a condition 202 in a storage group definition table 200. For instance, as to data where a storage group 201 is "enterprise", a condition related to a response time has been described in the condition 202 in order that such a volume suitable for a use field as the enterprise belongs thereto. Also, a volume characteristic table 120 has been constructed by containing a storage apparatus name 121, a volume number 122, a capacity 123, a status 124, a capacity unit price 125, and a response time 126. For instance, a storage group managing process operation S220 collects volumes which are fitted to the condition 202 of the storage group 201 based upon the storage group definition table 200 and the volume characteristic table 120, and then, acquires such volumes which belong to the respective storage groups 201. Then, a total capacity 212 of a volume which belongs to each of the storage groups 211 can be shown on a storage group list 210. The storage group list 210 has been constituted by containing the storage group 211 and the total capacity 212.

In this case, while a volume 121a through a volume 121d have been described in the volume characteristic table 120, such a volume having a volume characteristic which is fitted to the condition 201 of data where the storage group 201 is "mail" corresponds to both a volume 121b and a volume 121c of the volume characteristic table 120. On the other hand, such a volume having a volume characteristic which is fitted to the condition 202 of data where the storage group 201 is "archive" corresponds to a volume 121b, a volume 121c, and a volume 121d of the volume characteristic table 120. Both the volume 121b and the volume 121c belong to both the storage groups of "mail" and "archive."

At this time, it is so assumed that a user of the conventional storage system views the storage group list 210 and judges that a volume having a capacity of 300 GB can be used for the "mail" purpose, and another volume having a capacity of 550 GB can be used for the "archive" purpose. However, if the volume 121b and the volume 121c are used for the "mail" purpose, then an unused volume within the volumes suitable for the use field of "archive" is only the volume 121d. As a result, the volume having the capacity of 550 GB cannot be used for the "archive" purpose.

FIG. 31 is a graph for graphically representing a dividing condition of storage resources in the conventional technique. Referring now to FIG. 31 (referring properly to FIG. 30), a description is made of a subdivision as to the storage resources in the conventional technique. As shown in FIG. 31, in the graph for indicating the dividing condition of the storage resources, while both a capacity unit price "M1" and a response time "M2" are set as axes, such a point (marked with black circle) that a volume is mapped by employing the capacity unit price "M1" and the response time "M2" corresponds to a volume "V." An area "A1" shows a range where the storage group 201 is fitted to the condition 202 of the data as to "enterprise" as a characteristic of the volume "V." Similarly, an area "A2" indicates a range where the storage group 201 is fitted to the condition 202 of the data as to "mail" as a characteristic of the volume "V." Also, an area "A3" shows a range where the storage group 201 is fitted to the condition 202 of the data as to "archive" as a characteristic of the volume For instance, such a point which is present in an overlapped portion between the area Al and the area A2 corresponds to the volume "V" in which the characteristic can be fitted to both the condition 202 of such a data that the storage group 201 is "enterprise" and the condition 202 of such a data that the storage group 201 is "mail." In other words, the above-described point corresponds to the volume V which is suitable for both the use fields of "enterprise" and "mail."

In storage systems established based upon these conventional techniques, storage resources are subdivided into several pieces of groups in accordance with characteristics of volumes such as storage apparatus names, RAID structures, and response times. As a consequence, in order to subdivide these storage resources based upon use fields of volumes, these storage resources may be subdivided by employing the characteristics of the volumes suitable for the use fields of these volumes.

SUMMARY OF THE INVENTION

However, the above-described conventional technical ideas own the following problems. That is, if storage resources are subdivided by simply employing characteristics of volumes, then a volume having a certain characteristic may be suitable for a plurality of use fields. Accordingly, the user of the conventional storage system cannot acquire information (total capacity of volumes) related to the volume which may be used in the respective use fields.

As a consequence, an object of the present invention is to provide such a technical idea capable of subdividing storage resources, depending upon use field sorts, while volumes are not overlapped with each other among a plurality of use fields.

To achieve the above-explained object, a storage resource management system of the present invention is provided with a storage apparatus having one, or more pieces of volumes; and a management computer. The management computer holds volume characteristic information in which identification information of the volumes correspond to characteristic values of the volumes; and use field sort volume information in which use fields of the volumes correspond to conditions of characteristic values of the volumes suitable for this use field.

The management computer executes a single use field portion allocating sequence for allocating the use fields to volumes having volume characteristics suitable for a single use field from volume characteristics described in the use field sort volume information, and also, executes a plural use fields common portion allocating sequence for allocating volumes having volume characteristics suitable for the plural use fields to any use field. Since the sequences are executed by the management computer, such a use field sort volume allocation information is formed which has described that one use field in maximum is allocated to the volume, namely one use field is allocated thereto, or none of these use fields is allocated to the volume.

As previously explained, since the use field sort volume allocation list is formed, the storage resources can be subdivided based upon the use field sort while the volumes are not overlapped with each other among the plural use fields.

In accordance with the present invention, the storage resources can be subdivided based upon the use field sort while the volumes are not overlapped with each other among the plural use fields.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram for indicating major structural elements and process flow operations according to the first embodiment.

FIG. 4 is a diagram for indicating detailed contents of tables and process flow operations, which are related to a sequence for allocating use field sort volumes in the first embodiment.

FIG. 6 is a diagram for representing detailed contents of a use field sort volume allocation list in the first embodiment.

FIG. 26 is a diagram for showing a structural of a storage apparatus characteristic table in the third embodiment.

FIG. 30 is a diagram for indicating the process flow operations for forming the storage group list in the conventional technique.

DESCRIPTION OF THE EMBODIMENTS

Referring now to drawings, various embodiments of the present invention will be described.

First Embodiment

Figure 1:
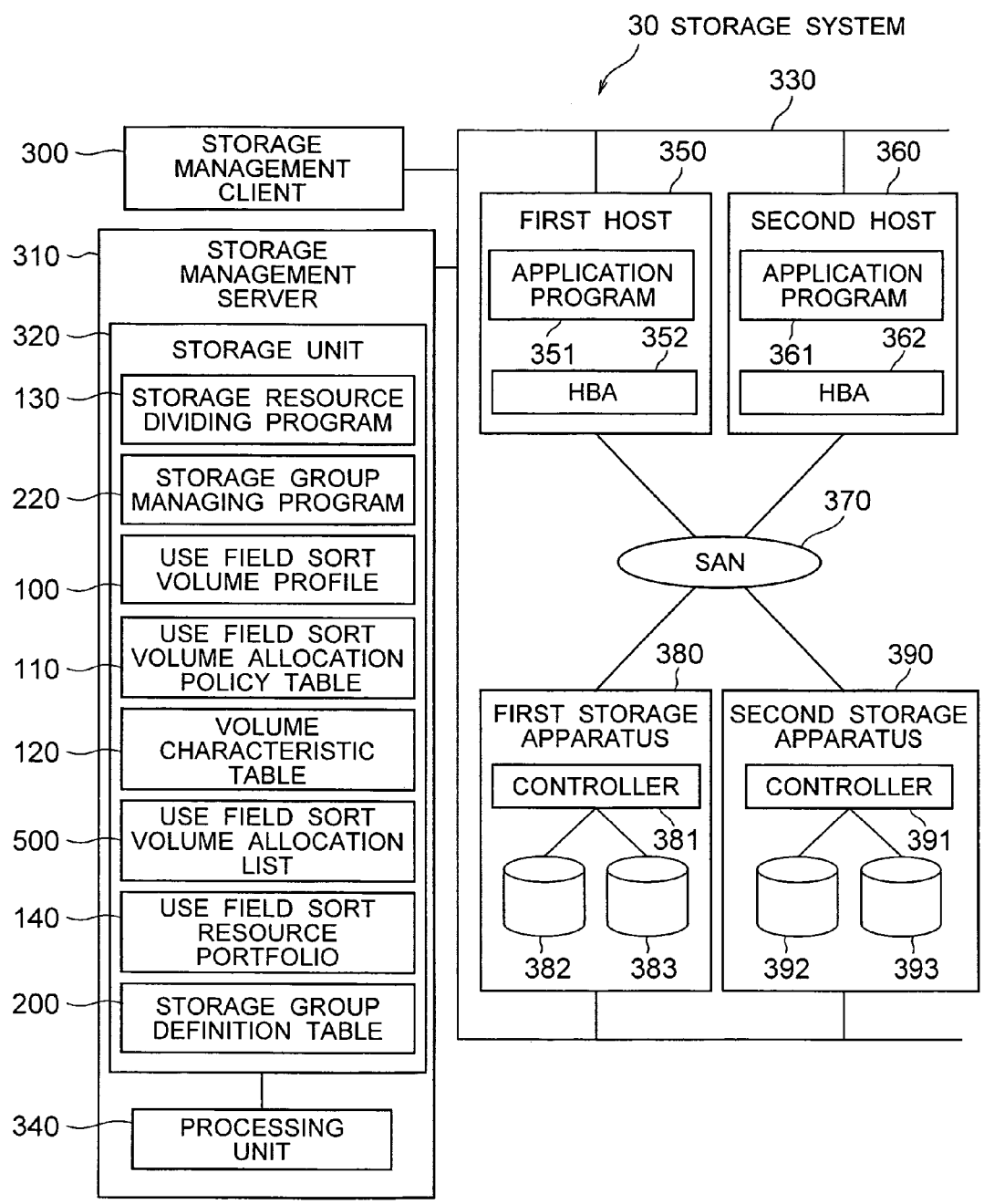
FIG. 1 is a structural diagram of a storage system according to a first embodiment of the present invention.

FIG. 1 is a structural diagram for showing a storage system 30 according to a first embodiment of the present invention.

As indicated in FIG. 1, a first storage apparatus 380 is connected via an SAN (Storage Area Network) 370 to a first host 350 and a second host 360, and is connected via a LAN (Local Are Network) 330 to a storage management server 310. The first storage apparatus 380 is provided with a volume 382 and a volume 383, which correspond to storage areas of data, and an I/O (Input/Output) connected via the SAN 370 to either the volume 382 or the volume 383, namely, a controller 381 for controlling input/output operations of data of the first storage apparatus 380 from an external unit.

Similar to the first storage apparatus 380, a second storage apparatus 390 is connected via the SAN 370 to the first host 350 and the second host 360, and is connected via the LAN 330 to the storage management server 310. Also, the second storage apparatus 390 is provided with a volume 392 and a volume 393, which correspond to storage areas of data, and an I/O (Input/Output) connected via the SAN 370 to either the volume 392 or the volume 393, namely, a controller 391 for controlling an input operation of data of the second storage apparatus 390 from the external unit, and an output operation of data of the second storage apparatus 390 to the external unit.

The first host 350 is equipped with an application (application program) 351 which uses a volume (volume 382, volume 383, volume 392, or volume 393 of a storage, and an HBA (Host Bus Adaptor) 352 which controls I/O to the SAN 370.

Similar to the first host 350, the second host 360 is provided with an application 361 and an HBA 362.

The storage management server 310 is equipped with the storage unit 320 and a processing unit 340. The storage unit 320 is constituted by, for example, a RAM (Random Access Memory), or the like. The storage unit 320 stores thereinto programs executed by the processing unit 340, data, and the like (will be explained later). That is, the storage unit 320 stores thereinto a storage resource dividing program 130, a storage group managing program 220, a use field sort volume profile 100, a use field sort volume allocating policy table 110, a volume characteristic table 120, a use field sort volume allocating list 500, a use field sort storage resource portfolio 140, and a storage group definition table 200. The storage resource dividing program 130 is a program which is executed by the processing unit 340. A detailed explanation as to the storage resource dividing program 130 will be made later. The storage group managing program 220 corresponds to such a program which is executed by the processing unit 340, and manages the storage system 30, namely, divides storage resources based upon the description of the storage group definition table 200, manages and displays volumes belonging to a storage group, and selects a volume so as to be allocated to a host.

The processing unit 340 is constituted by a CPU (Central Processing Unit) and the like, and owns a function capable of executing programs (storage resource dividing program 130, storage group managing program 220, and the like) which have been previously stored in the storage unit 320.

A storage management client 300 corresponds to such a client which is used to be connected to the storage management server 310 by a user of the storage system 30. The storage management client 300 is connected via the LAN 330 to the storage management server 310.

It should be understood that as indicated in FIG. 1, in this first embodiment, the storage system 30 has been arranged in such a manner that two sets of the storage apparatus each having two pieces of the volumes are connected via the networks to two sets of the hosts. The arrangement of the storage system 30 is not limited only to the above-explained arrangement. The storage system 30 may be alternatively arranged by containing, at least, a storage apparatus having one, or more pieces of volumes; a host connected to this storage apparatus via a network; and a storage management server connected to this storage apparatus.

Figure 2:
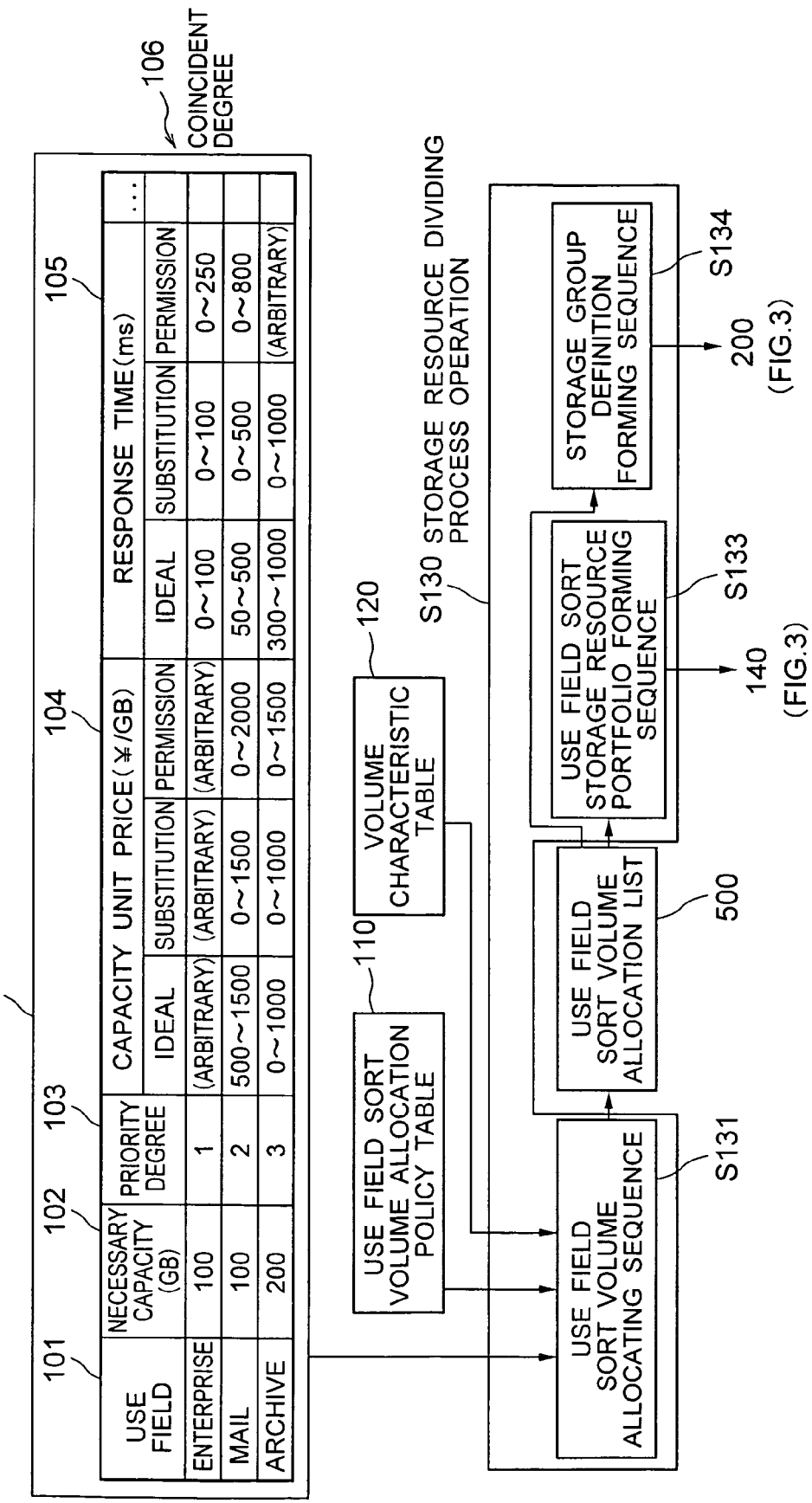
FIG. 2 is a diagram for indicating major structural elements and process flow operations according to the first embodiment.

FIG. 2 is a diagram for representing major structural elements and process flow operations in the storage system of the first embodiment. Referring now to FIG. 2 (referring properly to FIG. 1), the major storage elements and the process flow operations according to this first embodiment are explained.

The use field sort volume profile 100 describes characteristics of volumes which are suitable for use fields, depending upon coincident degrees. Names of use fields are described in a use field 101; necessary capacities of volumes suitable for the use fields are described in a necessary capacity 102; and priority degrees of the use fields are described in a priority degree 103. In this first embodiment, although both the necessary capacity 102 and the priority degree 103 are involved in the use field sort volume profile 100, another embodiment may be conceived in which these necessary capacity 102 and priority degree 102 are not involved in the use field sort volume profile 100.

The characteristics of the volumes suitable for the use fields are described depending upon the coincident degrees within a range of the values of the volume characteristics. In an example of FIG. 2, both a capacity unit price 104 and a response time 105 have been used as the volume characteristic. As other volume characteristics, a transfer speed, an IOPS (Input/Output per Second), a use rate, a RAID structure, a rotation speed of a disk, and the like may be used.

Also, in the example of FIG. 2, as the coincident degree 106, "ideal", "substitution", and "permission" have been used. In this case, the above-described coincident degree 106 indicates a degree of such a difference between a level of a characteristic (capacity unit price 104, response time 105 etc.) of a volume, and a level of a characteristic of a use field in the case that the storage management server 310 allocates the volume to the use field. The coincident degree of "ideal" indicates a ideal volume characteristic, into which the most ideal volume characteristic suitable for the use field is described. The coincident degree of "substitution" represents such a volume characteristic which can be substituted as a volume of this use field, although this volume is originally suitable for another use field, into which such a volume characteristic having a level higher than the necessary level is described, while this volume characteristic is suitable for this use field. Also, the coincident degree of "permission" shows a volume characteristic of a permittable range so as to secure a necessary capacity in such a case that the necessary capacity cannot be secured, into which such a volume characteristic having a permittable level is described, while the permittable level is lower than a level suitable for the use field. Although three sorts of items "ideal", "substitution", and "permission" are used as the coincident degree 106 in this first embodiment, this total number may be made different. 2 sorts of "ideal" and "substitution" may be used, and 4, or more sorts of coincident degrees may be alternatively employed.

The below-mentioned items may be judged based upon the contents described in the use field sort volume profile 100 of FIG. 2. For instance, referring now to a row of "mail" in the use field 101, as to the response time 105 of the volume suitable for "mail", although such a volume of a range between 50 and 500 is required in an ideal case, another volume of a range between 0 and 500 to which a range between 0 and 50 is added where performance of a response time is superior may also be substituted as the volume suitable of the use field "mail." Also, in such a case that a necessary capacity cannot be secured, another volume of a range between 0 and 800 to which a range between 500 and 800 whose performance is lower that of the use field of "ideal" is permitted as the use field of "mail."

A storage resource dividing process operation S130 is provided with a use field sort volume allocating sequence S131, a use field sort storage resource portfolio forming sequence S133, and a storage group definition forming sequence S134. The storage resource dividing process operation S130 is realized by that the storage resource dividing program 130 is executed by the processing unit 340. Also, the use field sort volume allocating sequence S131 forms the use field sort volume allocation list 500 with reference to the use field sort volume profile 100, the use field sort volume allocation policy table 110, and the volume characteristic table 120, and then, outputs the use field sort storage resource portfolio forming sequence S133 and the storage group definition forming sequence S134. A detailed description as to this use field sort volume allocating sequence S131 will be made later.

FIG. 3 is a diagram for representing major structural elements and process flow operations in the storage system of the first embodiment. Referring now to FIG. 3 (referring properly to FIG. 1), the major storage elements and the process flow operations according to this first embodiment are explained.

The use field sort storage resource portfolio 140 provides such a status that the storage resources are subdivided based upon use field sorts, and contains a use field sort volume capacity list 150 and an extra volume capacity list 160, and may be observed on a screen display format, or a file format from the storage management client 300.

The list 150 indicates a total capacity of volumes allocated to the use field, depending on the use field sort. A use field 151 indicates a name of a use field; a status 152 represents a satisfactory status of a necessary capacity and a status of a coincident degree as to the volume allocated to the use field; a necessary capacity 153 shows a necessary capacity of the use field; an allocated capacity 154 denotes a total capacity of the volume allocated to the use field; and also, a difference 155 represents a difference between a necessary capacity and an allocated capacity (in this case, allocated capacity-necessary capacity). As to an item 157 of a coincident degree, in order to indicate that a volume is allocated to a use field at which coincident degree, an allocated capacity of the volume is indicated, depending upon coincident degree (ideal 158$a$, substitution 158$b$, and permission 158$c$). A difference 156 within the ideal range indicates such a value which is obtained by subtracting the value of the necessary capacity 153 from the value of the ideal 158$a$.

The extra volume capacity list 160 shows statuses of volumes which are not allocated to use fields. A use field 161 represents a name of a use field; a substitution 162 shows a total capacity of a volume which satisfies a volume characteristic of a coincident degree "substitution", although this volume is not allocated to this use field; and a permission 163 shows a total capacity of a volume which satisfies a volume characteristic of a coincident degree "permission", although this volume is not allocated to this use field. An item 164 which is not coincident with any use field indicates a total capacity of volumes which do not satisfy volume characteristics of any coincident degrees with respect to all of the use fields.

The storage group definition table 200 describes definitions of storage groups. In a storage group managing process operation, storage resources are divided based upon this storage group definition table 200. A storage group 201 shows a name of a storage group, and a condition 202 represents a condition of a characteristic of a volume belonging to the storage group. In the condition 202, the condition is represented in the type of the condition formula as to the volume characteristic. Alternatively, the condition may be represented in other types in correspondence with such a type required in the storage group managing process operation. The storage group managing process operation is realized by that the storage group management program 220 is executed by the processing unit 340.

FIG. 4 is a diagram for representing detailed contents of tables and process flow operations, which are related to use field sort volume allocating sequential operations in the first embodiment. Referring now to FIG. 4 (referring properly to FIG. 1), a description is made of the detailed contents of the tables and the process flow operations related to the use field sort volume allocating sequential operations of this first embodiment.

Since a use field sort volume profile 100 is similar to that shown in FIG. 2, explanations thereof are omitted.

A use field sort volume allocating policy table 110 owns a dividing method 411 of a common portion for indicating how to allocate volumes suitable for a plurality of use fields to a single use field. As values of the dividing method 411 for the common portion, there are an "equal division" for equally dividing a volume entire portion suitable for a plurality of use fields to allocate the equally divided volumes to the respective use fields; a "priority degree" for allocating volumes to use fields having higher priority degrees; and the like. Also, the use field sort volume allocating policity table 110 owns a division range 412 which indicates a range to which use fields are allocated. As values of the division range 412, there are a "storage entire portion" for indicating all of volumes present in the storage system 30; an "unuse" for representing an unused volume among volumes present in the storage apparatus 30; a "storage apparatus name=<storage apparatus name>" (note that name of storage apparatus is entered to such a portion of <storage apparatus name>) which indicates such a volume present in a specific storage apparatus; and the like.

The volume characteristic table 120 describes characteristics of volumes present in the storage system 30. A storage apparatus name 121 indicates a name of a storage apparatus; a volume number 122 shows a number for identifying a volume; a capacity 123 represents a capacity of a volume; a status 124 denotes a use condition of a volume; a capacity unit price 125 shows a capacity unit price of a volume; and a response time 126 represents a response time of a volume. In the example sown in FIG. 4, both the capacity unit price and the response time are utilized as the volume characteristic.

Alternatively, other characteristics than the above-explained volume characteristic may be utilized similar to the volume characteristic used in the use field sort volume profile 100. It should also be noted that the volume characteristic of the volume characteristic table 120 must own all of the volume characteristics which are utilized in the use field sort volume profile 100.

Figure 5:
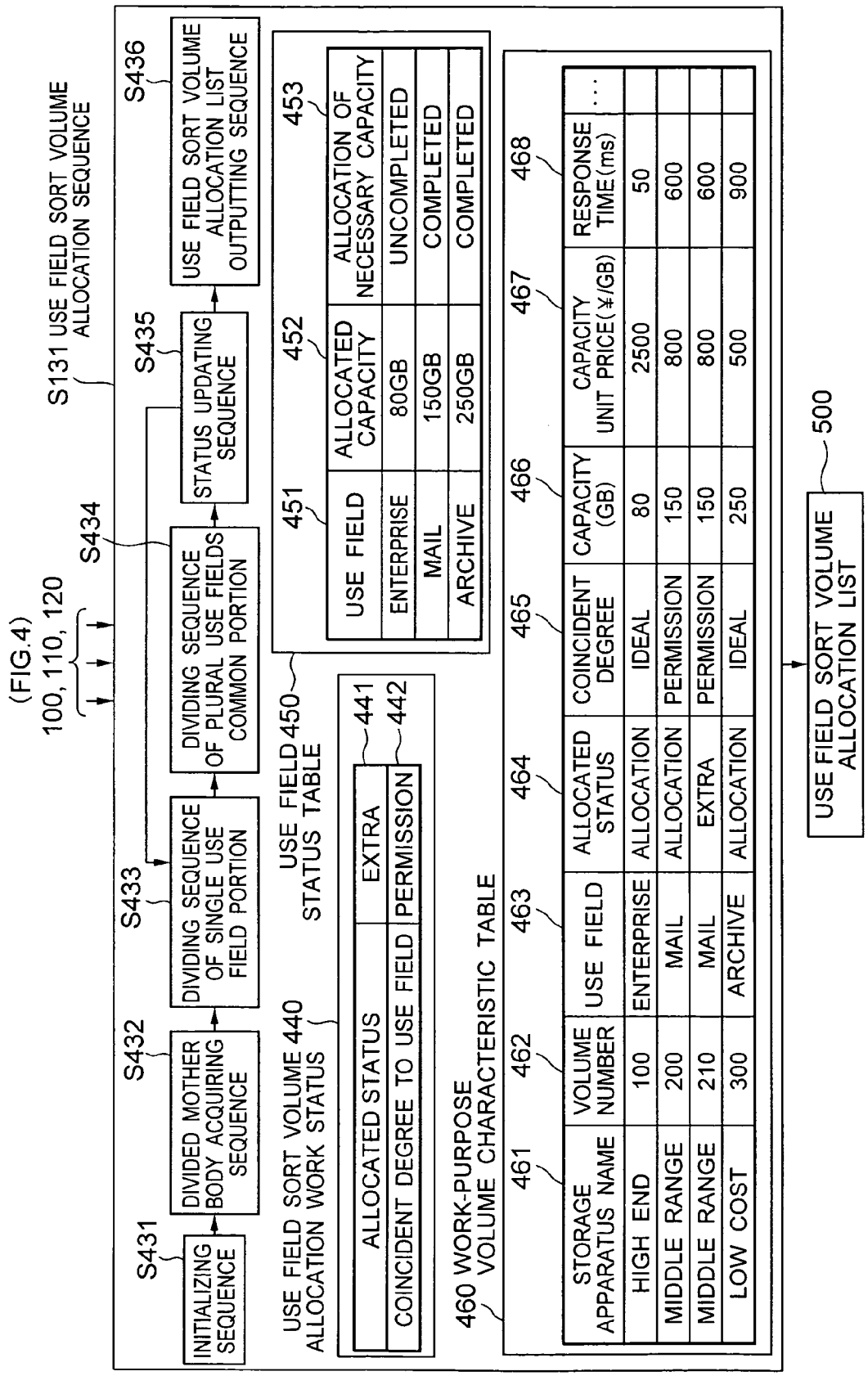
FIG. 5 is a diagram for indicating detailed contents of tables and process flow operations, which are related to a sequence for allocating use field sort volumes in the first embodiment.

FIG. 5 is a diagram for representing detailed contents of tables and process flow operations, which are related to use field sort volume allocating sequential operations in the first embodiment. Referring now to FIG. 5 (referring properly to FIG. 1), a description is made of the detailed contents of the tables and the process flow operations related to the use field sort volume allocating sequential operations of this first embodiment.

A use field sort volume allocating sequence S131 inputs the use field sort volume profile-100, the use field sort volume allocating policy table 110, and the volume characteristic table 120, and outputs a use field sort volume allocation list 500 which describes the use fields allocated to the volumes. The use field sort volume allocating sequence S131 may be subdivided into several sub-sequences, and thus, is arranged by an initializing sequence S431, a divided mother body acquiring sequence S432, an allocating sequence S433 of a single use field sort portion, an allocating sequence S434 of plural use fields common portion, a status updating sequence S435, and a use field sort volume allocating list output sequence S436. The use field sort volume allocating sequence S131 owns as internal statuses, a use field sort volume allocating work status 440, a use field status table 450, and a work-purpose volume characteristic field 460 in the storage unit 320.

The use field sort volume allocating work status 440 indicates work statuses of the use field sort volume allocating sequence S131. The allocation status 441 owns a value of either "allocated" or "extra." This allocation status 441 indicates as to whether the use field volume allocating sequence S131 judges a use field of a volume which is allocated to the use field (in case of "allocated"), or judges a use field of a volume which has not been allocated to the use field (in case of "extra"). A coincident degree 442 to the use field indicates as to whether the use field volume allocating sequence S131 judges a use of a volume as to any of the coincident degrees 106 of the use field sort volume profile 100.

The use status list 450 represents a condition of volumes allocated to use fields. A use field 451 indicates a name of a use field; an allocation capacity 452 shows a capacity allocated to a field use; and an allocation 453 of a necessary capacity represents as to whether or not a capacity higher than, or equal to a necessary capacity for a volume is allocated to a use field. A value of the allocation 453 of the necessary capacity becomes either "completed" or "uncompleted."

The work-purpose volume characteristic table 460 corresponds to such a table which is used in a work for allocating a use field to a volume. Descriptions (use field 463, allocation status 464, and coincident degree 465) have been added to this work-purpose volume characteristic table 460 instead of the description content (status 124) of the volume characteristic table 120. A storage apparatus name 461, a volume number 462, a capacity 466, a capacity unit price 467, and a response time 468 correspond to the storage apparatus name 121, the volume number 122, the capacity 123, the capacity unit price 125, and the response time 126 of the volume characteristic table 120. In such a case that the volume characteristic table 120 contains characteristics other than the capacity unit price 125 and the response time 126, these characteristics are also involved in the work-purpose volume characteristic table 460. Also, the use field 463, the allocated status 464, and the coincident degree 465 correspond to a use field 504, an allocated status 505, and a coincident degree 506 of a use field sort volume allocation list 500 (will be explained later with reference to FIG. 6), respectively, and indicate the same contents thereof, respectively.

FIG. 6 is a diagram for showing detailed contents as to the use field sort volume allocation list 500 in the first embodiment. The use field sort volume allocation list 500 corresponds to such a list which describes use fields allocated to volumes. A storage apparatus name 501 indicates a storage apparatus name; a volume number 502 shows a number for identifying a volume; and a capacity 503 represents a capacity of a volume. A use field 504 represents either a use field allocated to a volume or a use field allocatable to a volume. There are some cases that the use field 504 is an empty column, which represents that a volume is not allocated to any use field. An allocated status 505 indicates such a status that a use field is allocated to a volume, and becomes any one of "allocated", "extra", and an empty column. In the case that the allocated status 505 corresponds to "allocated", this status 505 shows that a use field described in the use field 504 is allocated to a volume. In the case that the allocated status 505 corresponds to "extra", this status 505 shows that although a use field is not allocated to a volume, any item is allocatable to the use field described in the use field 504. A coincident degree 506 indicates that a volume can satisfy a volume characteristic of which coincident degree in the case that a use field is described in the use field 504, namely shows a coincident degree with respect to the use field of the volume. The coincident degree 506 corresponds to an empty column in the that the use field 504 is an empty column.

Figure 7:
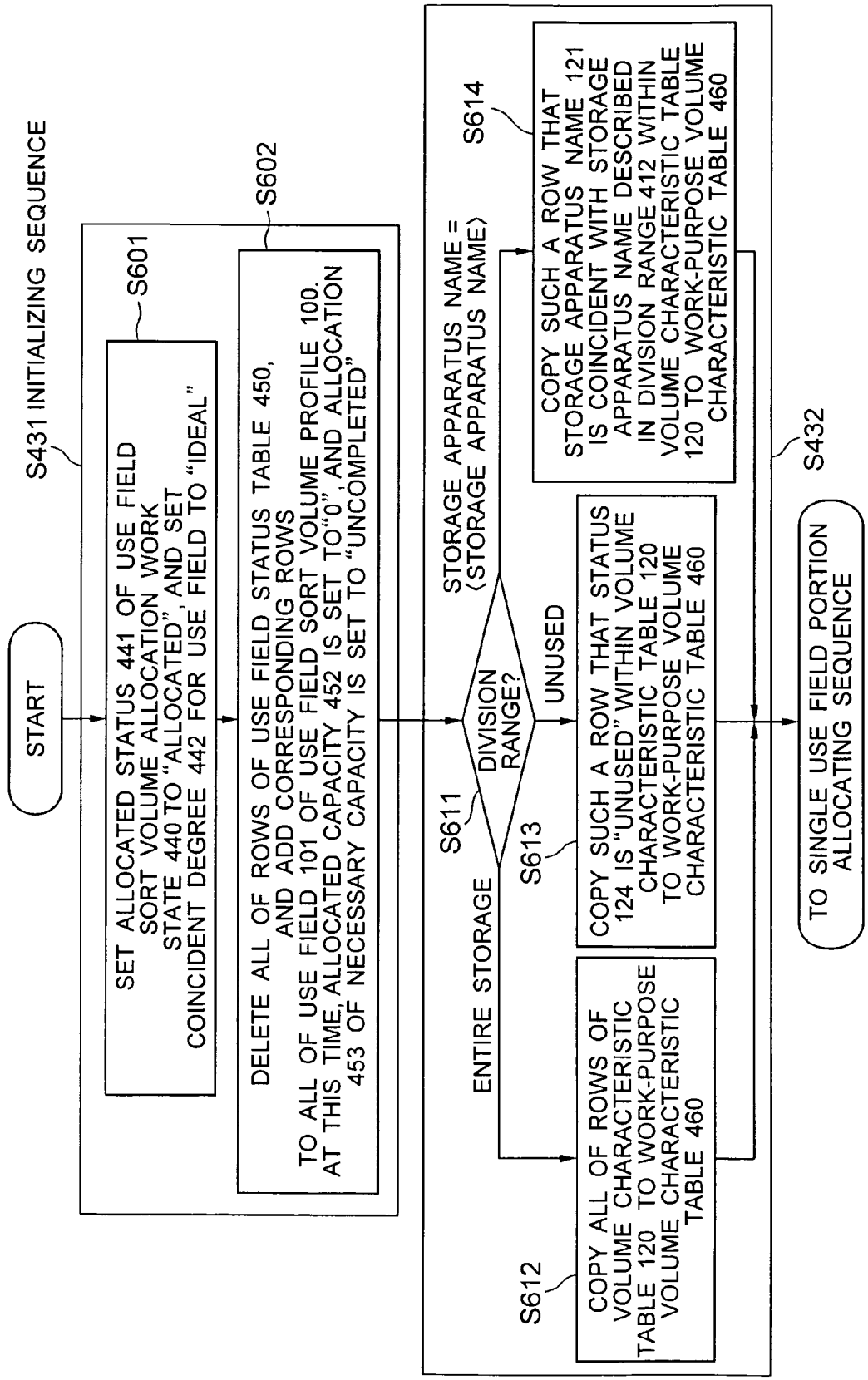
FIG. 7 is a flow chart for indicating initializing sequential flow operations and divided mother body acquiring sequential flow operations in the first embodiment.

FIG. 7 is a flow chart for describing flow operations as to an initializing sequence S431 and a divided mother body acquiring sequence S432 in the first embodiment. Referring now to FIG. 7 (referring properly to FIG. 1 through FIG. 6), the initializing sequential operation S431 and the divided mother body acquiring sequential operation S432 will be explained.

The initializing sequential operation S431 corresponds to such a sequential operation that the processing unit 340 initializes both the use field sort volume allocation status 440 and the use field status table 450. Firstly, the processing unit 340 sets the allocated status 441 of the use field sort volume allocating work status 440 to "allocated", and also sets the coincident degree 442 for the use field to "ideal" in order to initialize the use field sort volume allocating work status 440 (step S601). Then, in order to initialize the use field status table 450, the processing unit 340 deletes all of rows contained in the use field status table 450, and adds thereto rows which correspond to all of the use fields 101 contained in the use field sort volume profile 100. At this time, the processing unit 340 sets the allocated capacity to "0", and the allocation 453 of the necessary capacity to "uncompleted" (step S602). Thereafter, the initializing sequential operation is advanced to the divided mother body acquiring sequential operation S432.

The divided mother body acquiring sequential operation S432 corresponds to such a sequential operation that a volume for allocating a use field is acquired from the volume characteristic table 120 so as to form the work-purpose volume characteristic table 460. Firstly, the divided mother body acquiring sequential operation S432 judges a value of a division range 412 (step S611). In the case that the value of the division range 412 corresponds to "entire storage" ("entire storage" in step S611), all of the rows of the volume characteristic table 120 are copied to the work-purpose volume characteristic table 460 (step S612). In the case that the value of the division range 412 corresponds to "unused" ("unused"

in step S611), such a row that the status 124 is "unused" within the volume characteristic table 120 is copied to the work-purpose volume characteristic table 460 (step S613). When the value of the division range 412 corresponds to [storage apparatus name=<storage apparatus name>](storage apparatus name is entered to <storage apparatus name >) (in step S611, [storage apparatus name=<storage apparatus name>], such a row that the storage apparatus name is made coincident with the storage apparatus name described in the division range 412 within the volume characteristic table 120 is copied to the work-purpose volume characteristic table 460 (step S614).

Figure 8:
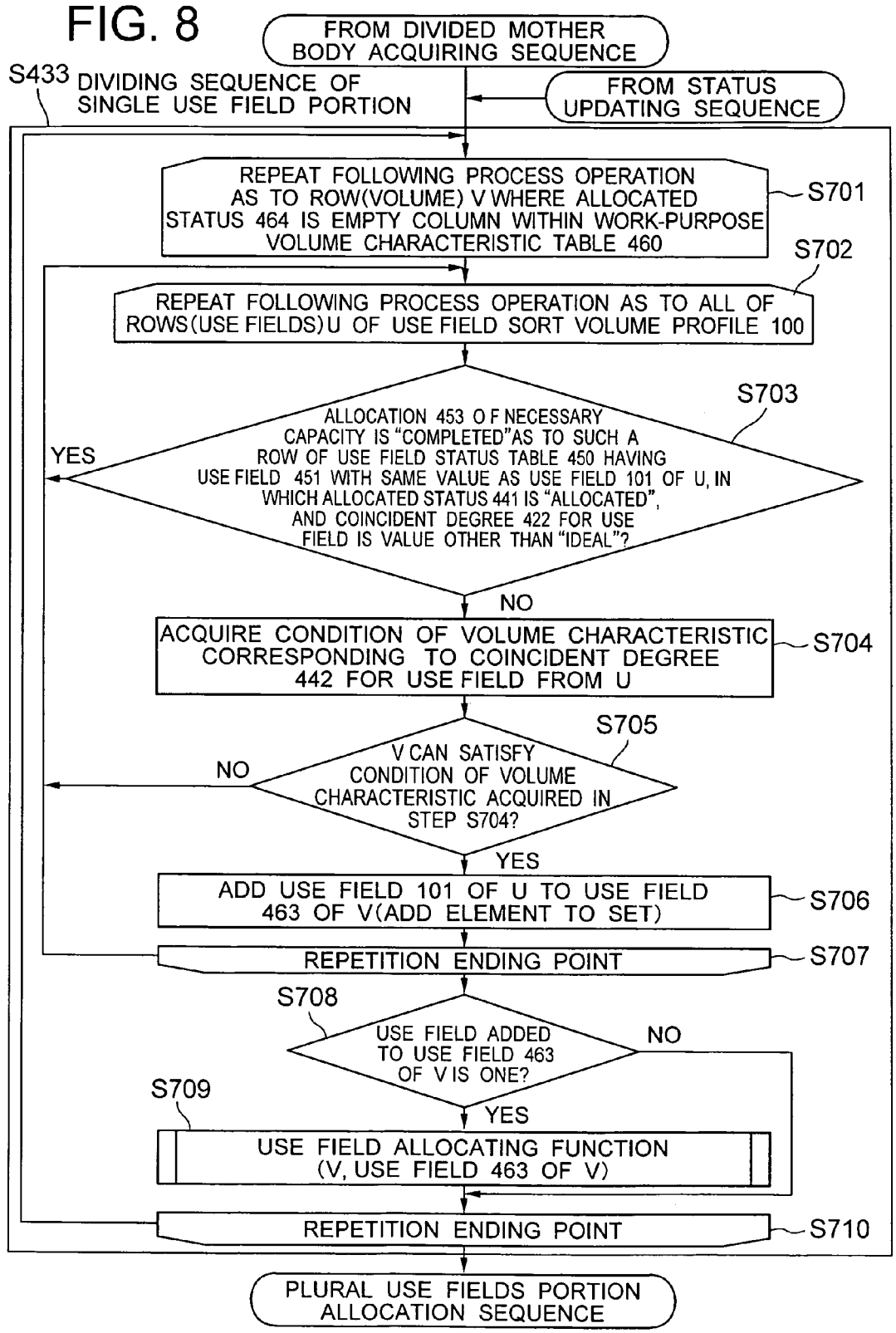
FIG. 8 is a flow chart for showing allocating sequential operations of a single use field portion in the first embodiment.

FIG. 8 is a flow chart for representing flow operations as to the allocating sequential operation S433 of the single use field portion in the first embodiment. Referring now to FIG. 8 (referring properly to FIG. 1 through FIG. 6), a description is made of the allocating sequential operation S433 of the single use field portion of this first embodiment.

The single use field portion allocating sequential operation S433 is executed after the divided mother body acquiring sequential operation S433, or after the status updating sequential operation S435, and corresponds to such a sequential operation that the processing unit 340 allocates a use field to a volume having a volume characteristic suitable for a single use field.

Firstly, the processing unit 340 repeatedly performs the below-mentioned process operation with respect to a row (volume) "V" in which the allocation status 464 is an empty column within the work-purpose volume characteristic table 460 (step S701). Subsequently, the processing unit 340 repeatedly performs the below-mentioned process operation with respect to all of the rows (use fields) "U" of the use field sort volume profile 100 (step S702). Firstly, the processing unit 340 judges as to whether or not with respect to a row of the use field status table 450, which owns any value other than the value in which the allocation status 441 is "allocated" and the coincident degree 422 for the use field is "ideal", and further, owns the use field 451 having the same value as the value "U" of the use field 101, the allocation 453 of the necessary capacity thereof can establish "completed" (step S703). When the allocation 453 can establish "completed" ("Yes" in step S703), the process operation is returned to the step S702 in which a next repetition process operation is carried out. When the allocation 453 cannot establish "completed" ("NO" in step S703), the processing unit 340 executes sequential operations subsequent to the step S704.

The processing unit 340 acquires a condition of a volume characteristic corresponding to the coincident degree 442 to the use field from the row "U" (step S704), and judges as to whether or not the row "V" can satisfy the condition of the volume characteristic acquired in the step S704 (step S705). For example, if the use field 101 of the row "U" is "enterprise" and the coincident degree 442 to the use field is "permitted", then the processing unit 340 acquires "arbitrary" as "permitted" of the capacity unit price 104, and acquires 0 to 250 as "permitted" of the response time 105; and in the step S705, the processing unit 340 compares these values with the capacity unit price 467 and the response time 468. When these values cannot satisfy ("NO" in step S705), the process operation is returned to the step S702 in which a next repetition process operation is carried out. When the these values can satisfy ("YES" in step S705), the processing unit 340 adds the use field 101 of the row "U" to the use field 463 of the row "V" (add element to set) in a step S706. This adding operation is an adding calculation to the set, for instance, in such a case that the use field 463 of V is "mail" and the use field 101 of U is "archive", the use field 463 of V becomes "mail, achieve."

After this step S706 has been executed, the process operation is returned to the step S702 in which a next repetition process operation is carried out.

After the repetition process operation defined from the step S702 to the step S707 is accomplished, the processing unit judges as to whether or not the use field added to the use field 463 of "V" is 1 (step S708). When the added use field is 1 ("YES" in step S708), the processing unit 340 calls a use field allocation function (will be explained later) in a step S709, and then, the process operation is returned to the step S701 in which a next repetition process operation is carried. It should also be understood that as to arguments used when the use field allocation function is called, a first argument corresponds to "V", and a second argument corresponds to the use field 463 of "V." When the processing unit 430 judges that the use field is not equal to 1 in the step S708 ("NO" in step S708), the process operation is returned to the step S701 in which a next repetition process operation is carried out. After the repetition process operation defined from the step S701 to the step S710 has been accomplished in the above-explained manner, the process operation is advanced to the allocating sequential operation S434 of the plural use fields common portion.

Figure 9:
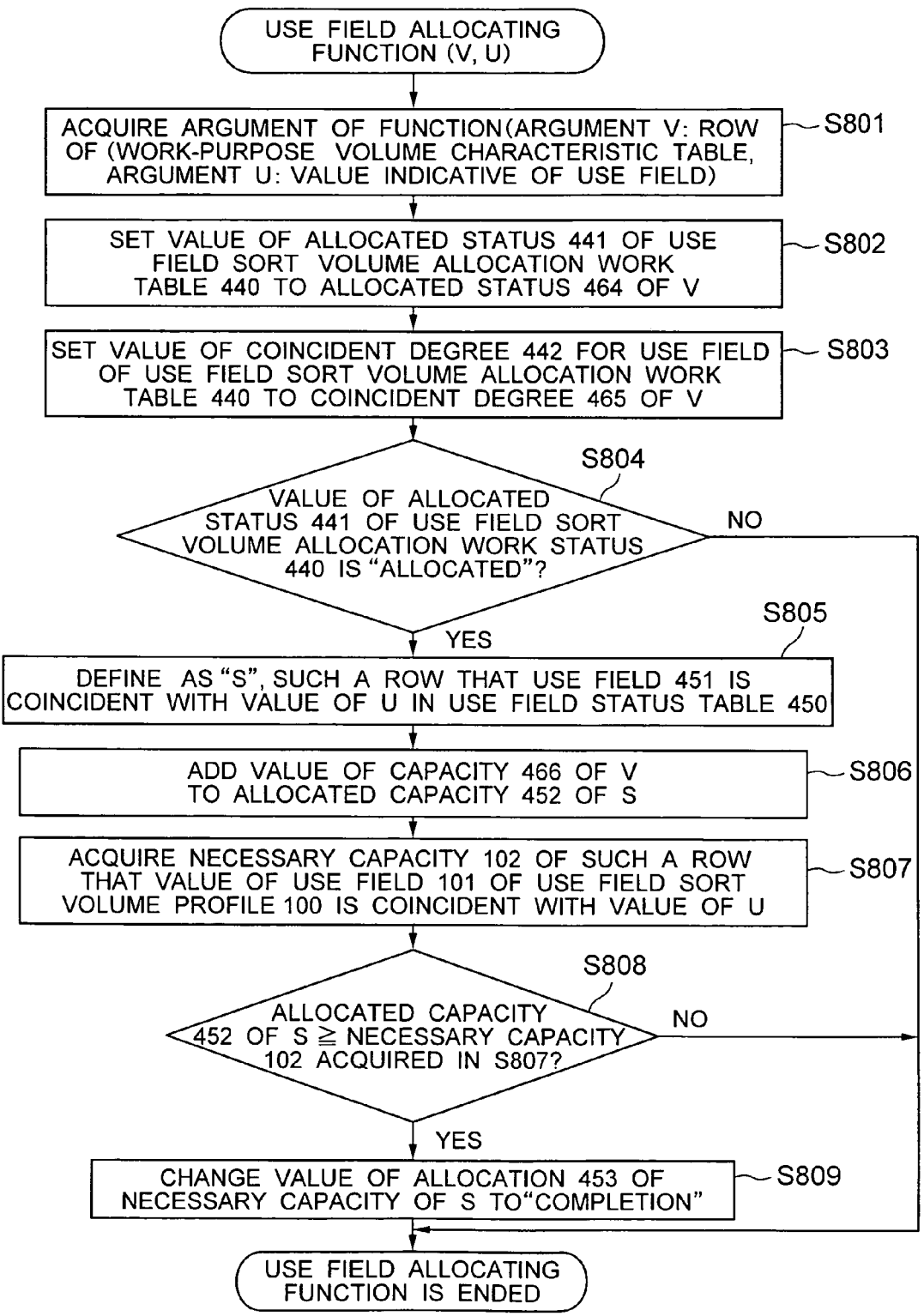
FIG. 9 is a flow chart for indicating process flow operation as to a use field allocation function in the first embodiment.

FIG. 9 is a flow chart for indicating flow operations for processing a use field allocation function in the first embodiment. Referring now to FIG. 9 (referring properly to FIG. 1 through FIG. 6), a description is made of the use field allocation function of this first embodiment.

The use field allocation function corresponds to such a function that one row of the work-purpose volume characteristic table 460 is received as the first argument "V" and a value representative of a use field is received as the second argument "U", and also corresponds to a sequential operation when the processing unit 340 allocates the use field "U" to the volume "V."

In the use field allocation function, the processing unit 340 firstly acquires an argument of a function. Concretely speaking, the processing unit 340 acquires the row of the work-purpose volume characteristic table 460 as the first argument V of the function, and acquires the value indicative of the use field as the second argument U (step S801). Next, the processing unit 340 sets the value of the allocated status 441 of the use field sort volume allocation work status 440 to the allocated status 464 of V (step S802), and also, sets the value of the coincident degree 442 for the use field in the use field sort volume allocation work status 440 (step S803). Subsequently, the processing unit 340 judges as to whether or not the value of the allocated status 441 of the use field sort volume allocation work status 440 corresponds to "allocated" (step S804). When this value corresponds to "extra" ("NO" in step S804), the execution of this function is ended. When this value corresponds to "allocated" ("YES" in step S804), the processing unit 340 executes steps subsequent to the above-explained step S805.

Next, assuming now that a row of the use field status table 450 is "S" in which the use field 451 is coincident with the value of U (step S805), the processing unit 340 adds the value of the capacity 466 of V to the allocated capacity 452 of S (step S806). In this case, the processing unit 340 acquires the necessary capacity 102 of such a row that the value of the use field 101 of the use field volume profile 100 is coincident with the value of U (step S807), and then, judges as to whether or not the allocated capacity 452 of S is larger than, or equal to the necessary capacity 102 acquired in the step S807 (step S808). If the allocated capacity 452 of S is smaller than the necessary capacity 102 ("NO" in step S808), then the execution of this function is ended. If the allocated capacity 452 of S is larger than, or equal to the necessary capacity 102 ("YES" in step S808), the processing unit 340 changes the value of the allocation 453 of the necessary capacity of S to "completion" (step S809).

Figure 10:
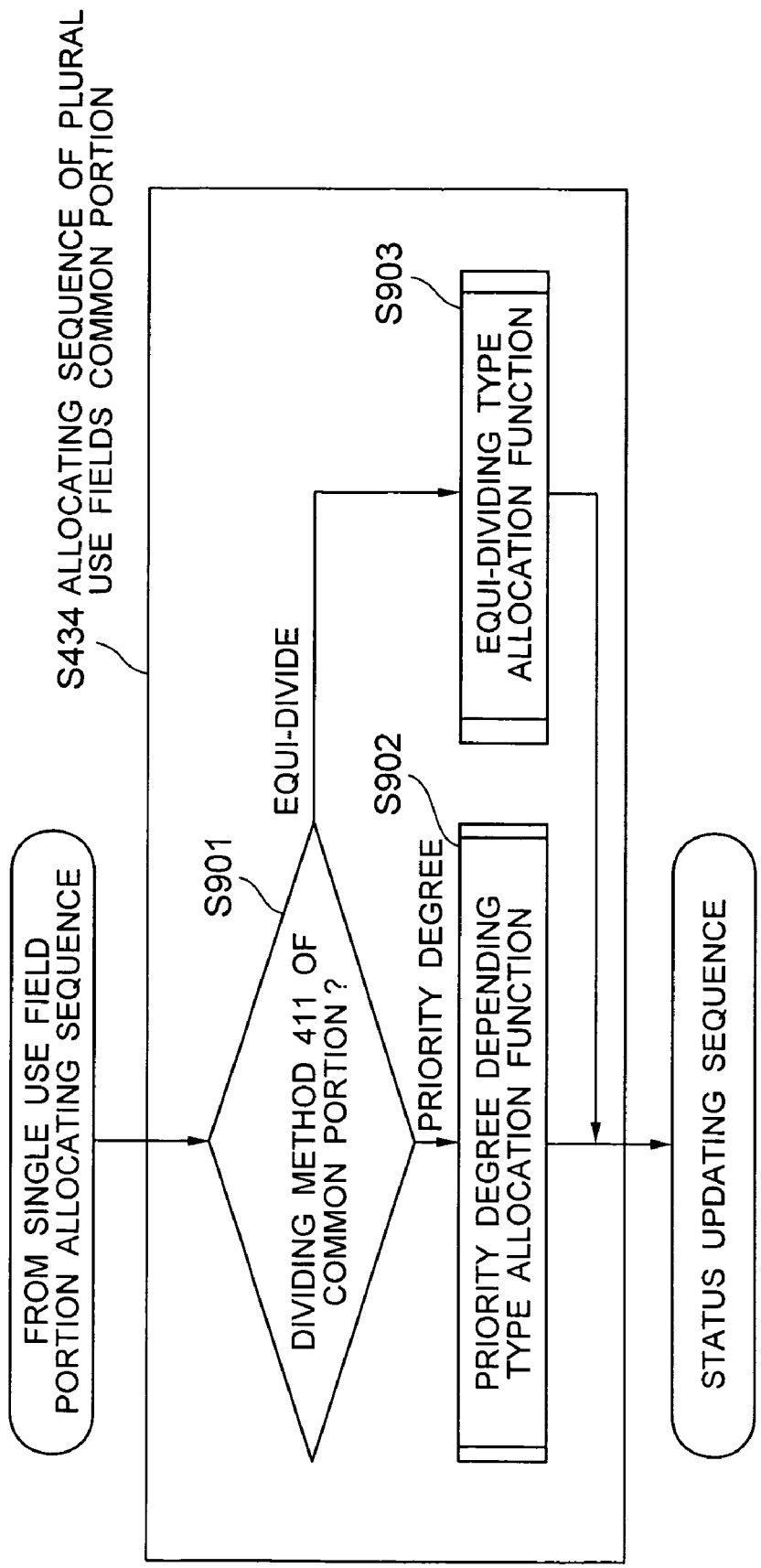
FIG. 10 is a flow chart for indicating allocating sequential operations of a plural use fields common portion in the first embodiment.

FIG. 10 is a flow chart for explaining sequential flow operations for allocating plural use fields common portions in the first embodiment. Referring now to FIG. 10 (referring properly to FIG. 1 to FIG. 6), a description is made of the sequential operation S434 for allocating the plural use fields common portion of this first embodiment.

The allocating sequential operation S434 of the plural use fields common portion corresponds to such a sequential operation which is executed after the allocating sequential operation S433 of the single use field portion, and is a sequential operation for allocating a volume having a volume characteristic suitable for a plurality of use fields to any one of the use fields.

Firstly, the processing unit 340 judges a value of the dividing method 411 for the common portion (step S901). If the value of the dividing method 411 of the common portion corresponds to "priority degree" ("priority degree" in step S901), then the processing unit 340 executes such a function (will also be referred to as "priority degree depending type allocation function" hereinafter) which allocates the common portion in accordance with the priority degree (step S902). If the value of the dividing method 411 corresponds to "equi-division" ("equi-division in step S901), then the processing unit 340 executes such a function (will also be referred to as "equi-division type allocation function" hereinafter) which equi-divides the common portion to allocate the equi-divided common portions (step S903). Both the priority degree depending type allocation function and the equi-division type allocation function will be explained later. The sequential operation 434 for allocating the plural use field common portion is accomplished, and then, the process operation by the processing unit 340 is advanced to a status updating sequential operation S435. This status updating sequential operation S435 will be described later.

Figure 11:
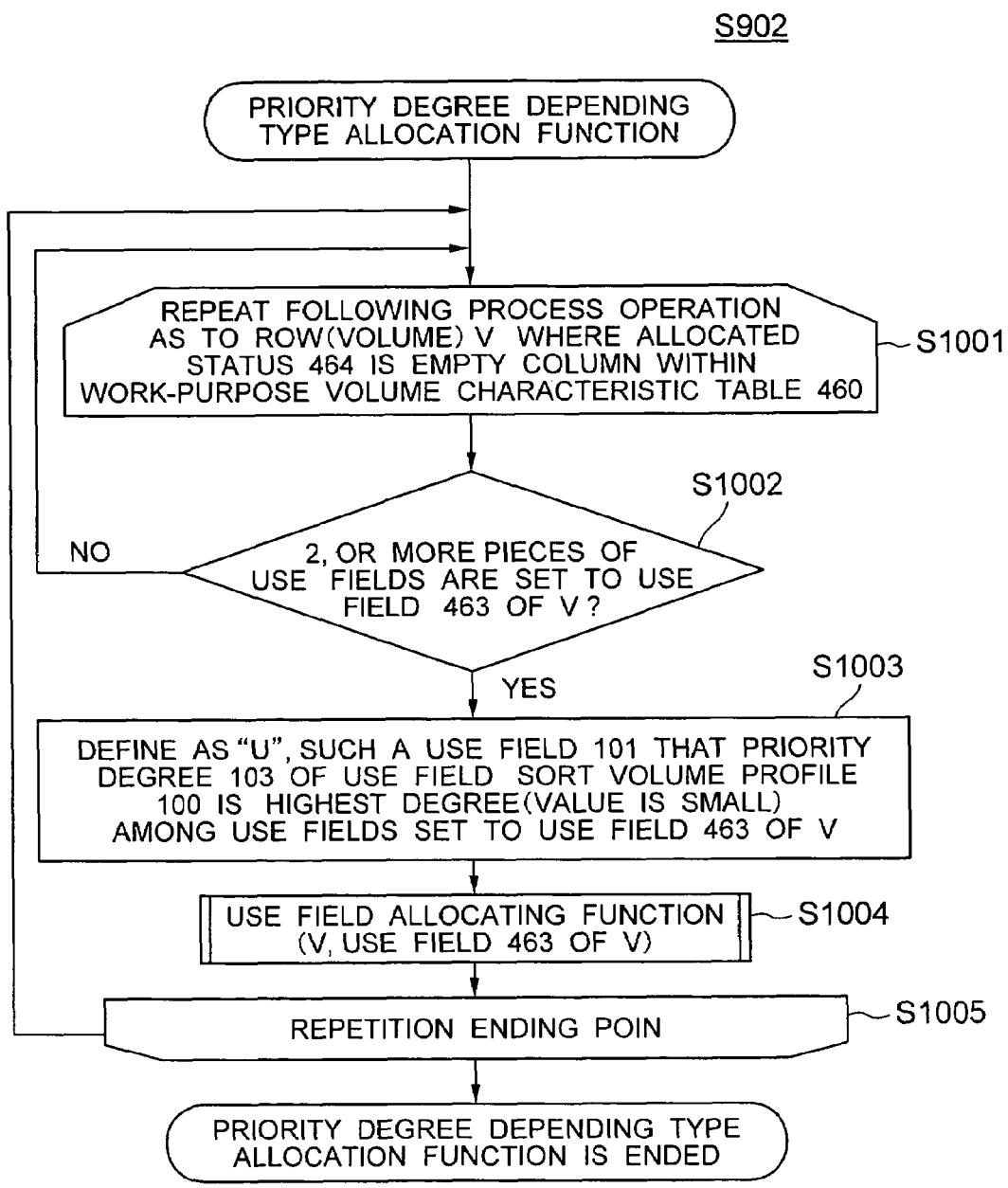
FIG. 11 is a flow chart for describing process flow operations as to a priority dependent type allocation function in the first embodiment.

FIG. 11 is a flow chart for explaining process flow operations as to the priority degree depending type allocation function in the first embodiment. Referring now to FIG. 11 (referring properly to FIG. 1 through FIG. 6), the priority degree depending type allocation function of this first embodiment will be explained.

In the priority degree depending type allocation function, the processing unit 340 repeatedly executes the below-mentioned process operation as to such a row (volume) "V" that the allocated status 464 is an empty column within the work-purpose volume characteristic table 460 (step S1001). Firstly, the processing unit 340 judges as to whether or not two, or more pieces of use fields are set to the use field 463 of "V" (step S1002). If two, or more pieces of use fields are not set to the use field 463 of "V" ("NO" in step S1002), then the process operation is returned to the step S1001 in which a next repetition process operation is carried out. If two, or more pieces of use fields are set to the use field 463 of "V" ("YES" in step S1002), the processing unit 340 executes sequential operations subsequent to the step S1003.

In this case, it is so assumed that such a use field 101 that priority degree 103 of the use field sort volume profile 100 is the highest degree (namely, value is small) is defined as "U" among the use fields set to the use field 463 of V (step S1003). Then, the use field allocation function is executed while the first argument is V and the second argument is U (step S1004). After the process operation of this function is ended, the process operation is returned to the step S1001 in which a next repetition process operation is carried out. When the repetition process operation defined from the step S1001 to the step S1005 has been ended in the above-explained manner, the priority degree depending type allocation function is accomplished.

Figure 12:
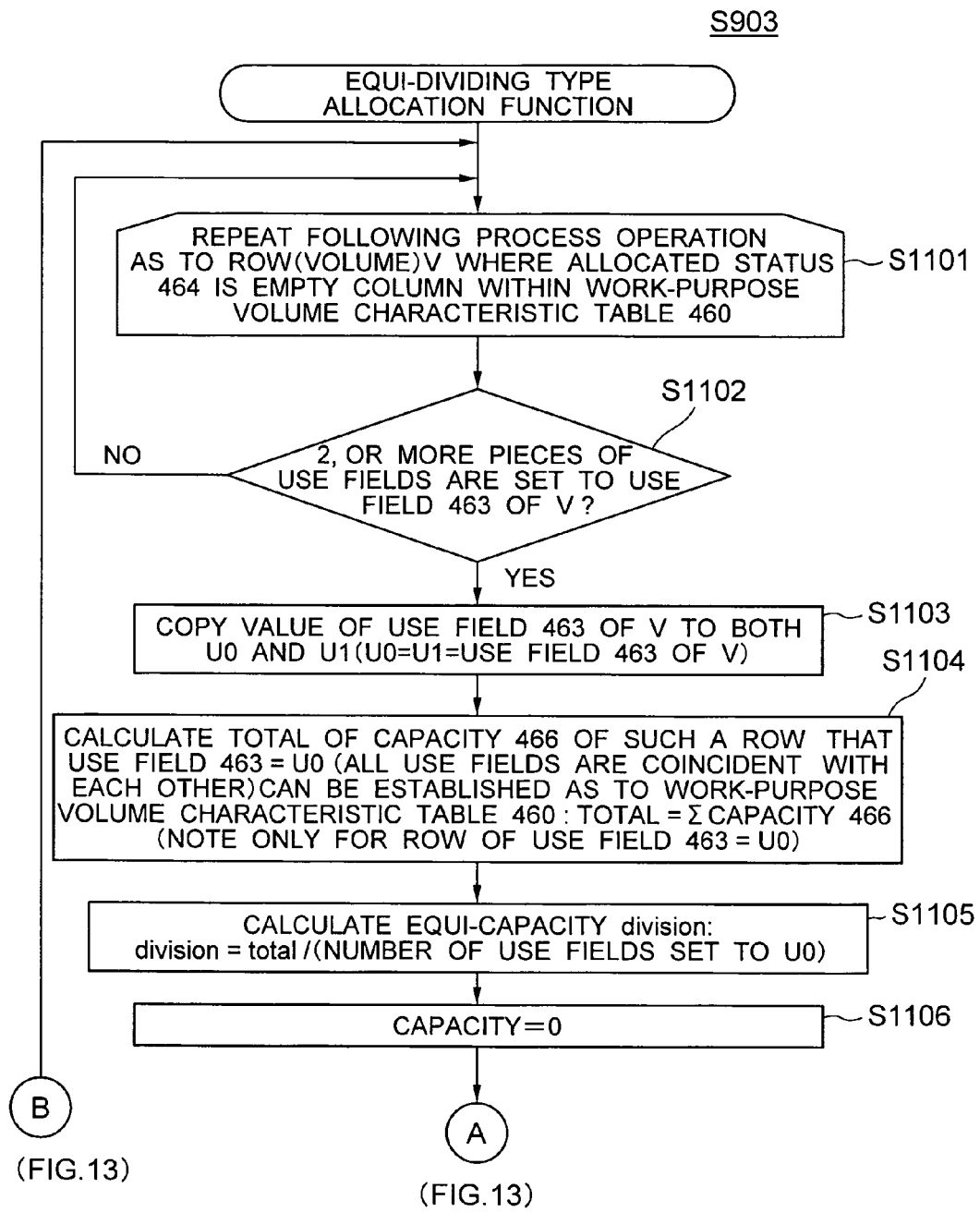
FIG. 12 is a flow chart for explaining process flow operations as to an equi-division type allocation function in the first embodiment.
Figure 13:
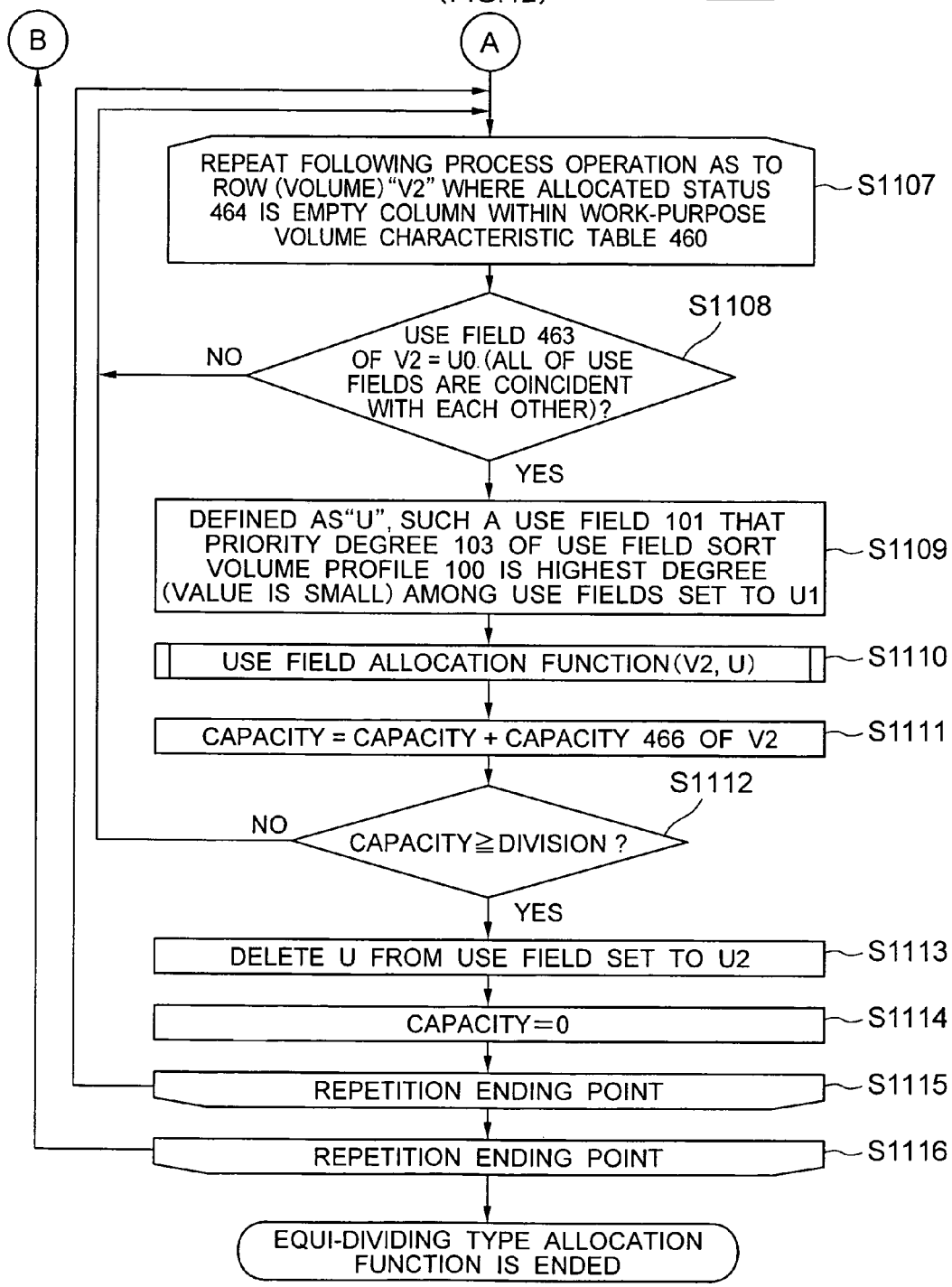
FIG. 13 is a flow chart for explaining process flow operations as to an equi-division type allocation function in the first embodiment.

FIG. 12 and FIG. 13 are flow charts for indicating process flow operations as to equi-division type allocation function in the first embodiment. Referring now to FIG. 12 and FIG. 13 (referring properly to FIG. 1 to FIG. 6), a description is made of the equi-division type allocation function of this first embodiment.

In the equi-division type allocation function, the processing unit 340 repeatedly executes the below-mentioned process operation as to such a row (volume) "V" that the allocation status 464 is an empty column within the work-purpose volume characteristic table 460 (step S1101). Firstly, the processing unit 340 judges as to the whether or not two, or more pieces of use fields are set to the use field 463 of V (step S1102). If two, or more pieces of use fields are not set to the use field 463 of "V" ("NO" in step S1102), then the process operation is returned to the step S1101 in which a next repetition process operation is carried out. If two, or more pieces of use fields are set to the use field 463 of "V" ("YES" in step S1103), then the process operation executes sequential operations subsequent to the step S1103.

Firstly, the processing unit 340 copies the value of the use field 463 of V to a variable "U0" and a variable "U1" (U0=U1=use field 463 of V) (step S1103). Next, as to the work-purpose volume characteristic table 460, the processing unit 340 calculates a total "total" of the capacities 466 of the rows where the use fields 463=U0 (all of use fields are coincident with each other) can be established (step S1104). In this case, such an operation that the use fields 463=U0 (all of use fields are coincident with each other) can be established implies that all of the use fields contained in the use field 463 are made coincident with all of use fields contained in "U0" (be equal as set). As to all of such rows capable of satisfying the use field 463=U0, the processing unit 340 calculates a total "total" of the capacities 466 thereof. The processing unit 340 calculates an equi-division capacity (namely, capacity obtained by subdividing total capacity "total" by plural use fields) "division" based upon division=total/(number of use fields set to "U0") in a step S1105.

Subsequently, the processing unit 340 sets variable "capacity"=0 (step S1106).

Then, the processing unit 340 repeatedly executes the below-mentioned process operation as to such a row (volume) "V2" that the allocation status 464 is an empty column within the work-purpose volume characteristic table 460 (step S1107). Firstly, the processing unit 340 judges as to whether or not the use field 463 of V2 is made coincident with "U0" (all of use fields are coincident therewith) (step S1108). In other words, the processing unit 340 judges as to whether or not the use field 463 of V2 is equal to "U0" as the set. In the case that this judgement cannot be established ("NO" in step S1108), the process operation is returned to the step S1107 in which a next repetition process operation is performed. When this judgement can be established ("YES" in step S1108), the processing unit 340 executes steps subsequent to the step S1109.

It is now assumed that among the use fields set to U1, such a use field 101 that the priority degree 103 of the use field sort volume profile 100 is the highest degree (namely, value of priority degree 103 is smallest) is defined as "U" (step S1109). Then, the processing unit 340 executes the use field allocation function while the first argument is V2 and the second argument is U (step S1110). Then, the capacity 466 of "capacity+V2" is substituted for the variable "capacity" (step S1111). In this case, the processing unit 340 judges as to whether or not the variable "capacity" is larger than, or equal to the equi-divisional capacity "division" (step S1112). In the case that this judgement cannot be established ("NO" in step S1112), the process operation is returned to the step S1107 in which a next repetition process operation is performed. When this judgement can be established ("YES" in step S1112), the processing unit 340 executes steps subsequent to the step S1113.

Next, the processing unit 340 deletes U from the use fields set to U1 (step S1113). In this case, the processing unit 340 performs such a calculation that the element U is deleted from the set U1. Then, the processing unit 340 sets variable "capacity"=0 (step S1114). Thereafter, the process operation is returned to the step S1107 in which a next repetition process operation is carried out. After the repetition process operation defined from the step S1107 to the step S1115 has been accomplished, the process operation is returned to the step S1101 in which a next repetition process operation is carried out. When the repetition process operation defined from the step S1101 to the step S1116 has been ended in the above-explained manner, the equi-division type allocation function is accomplished.

As previously explained, when the volumes of the work-purpose volume characteristic table 460 are allocated in the equi-divisional manner to the respective use fields 101 of the use field sort volume profile 100, these volumes are allocated to the use fields whose priority degrees 103 are high in this order that the data of the volumes are derived from the work-purpose volume characteristic table 460. However, as to the method for equally subdividing the volumes, the present invention is not limited only to the above-described method. For instance, while priority degrees are also provided with characteristics of volumes, the volumes may be alternatively allocated to the use fields whose priority degrees 103 are high in such an order of volumes having higher priority degrees, whose characteristics are superior among the data of the volumes derived from the work-purpose volume characteristic table 460 (if priority degree of response time 126 is high, from this order from volume whose response time 126 is small).

Figure 14:
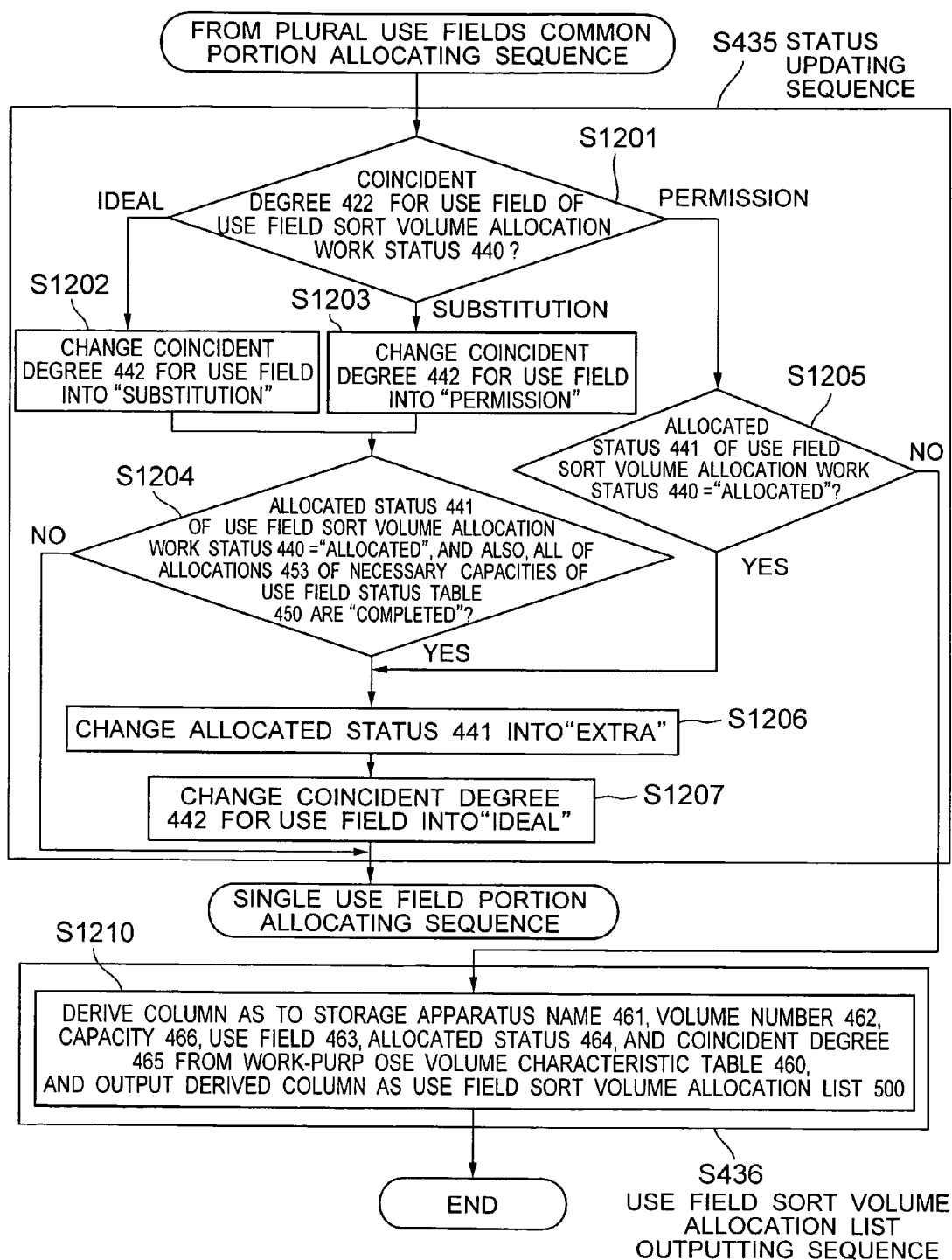
FIG. 14 is a flow chart for indicating status updating sequential flow operations and use field sort volume allocation list outputting sequential flow operations in the first embodiment.

FIG. 14 is a flow chart for indicating flow operations as to the status updating sequential operations and use field sort volume allocation list outputting sequential operations in the first embodiment. Referring now to FIG. 14 (referring properly to FIG. 1 through FIG. 6), both the status updating sequence S435 and the use field sort volume allocation list outputting sequence S436 of this first embodiment are explained.

In this case, the status updating sequence S435 corresponds to such a sequence that the use field sort volume allocation work status 440 is updated, and a judgement is made as to whether the process operation is advanced to the allocating sequence S433 of the single use field portion, or the use field sort volume allocation list outputting sequence S436. The use field sort volume allocation list outputting sequence S436 corresponds to such a sequence that the work-purpose volume characteristic table 460 is inputted, and the use field sort volume allocation list 500 is outputted.

In the status updating sequence S435, the processing unit 340 firstly judges a value of the coincident degree 422 for the use field of the use field volume allocation work condition 440 (step S1201). In the case that the coincident degree 442 for the use field is "ideal" ("ideal" in step S1201), the processing unit 340 changes the coincident degree 442 for the use field into "substitution" (step S1202), and in the case that the coincident degree 442 for the use field is "substitution" ("substitution" in step S1201), the processing unit 340 changes the coincident degree 442 for the use field into "permission" (step S1203). Thereafter, the processing unit 340 judges as to whether or not the value of the allocated status 441 of the use field sort volume allocation work status 440 is "allocated", and all of the allocations 453 of the necessary capacities of the use field status table 450 are "completed" (step S1204). In the case that this judgement cannot be established ("NO" in step S1204), the status updating sequential operation S435 is ended, and the process operation is advanced to the allocating sequential operation S433 of the single use field portion. In the case that this judgement can be established ("YES" in step S1204), the process operation is advanced to the subsequent step S1206.

In such a case that the value of the coincident degree 442 for the use field is "permission" in the step S1201 ("permission" in step S1201), the processing unit 340 judges as to whether or not the allocation status 44i of the use field sort volume allocation work status 440 is "allocation" (step S1205). In the case that this judgement cannot be established ("NO" in step S1205), the status updating sequential operation S435 is ended, and the process operation is advanced to the use field sort volume allocation list outputting sequential operation S436. In the case that this judgement can be established ("YES" in step S1205), the process operation is advanced to the subsequent step S1206.

In the step S1206, the allocated status 441 is changed into "extra" (step S1206). Next, the coincident degree 442 for the use field is changed into "ideal" (step S1207). Then, the status updating sequential operation S435 is ended, and the process operation is advanced to the allocation sequential operation S433 of the single use field portion.

In the use field sort volume allocation list outputting sequential operation S436, a column of the storage apparatus name 461, the volume number 462, the capacity 466, the use field 463, the allocation status 464, and the coincident degree 465 are derived from the work-purpose volume characteristic table 460, and then, are outputted as the use field sort volume allocation list 500 (step S1210). In this example, as to all of the rows of the work-purpose volume characteristic table 460, it is so assumed that a column of the storage apparatus name 461, the volume number 462, the capacity 466, the use field 463, the allocated status 464, and the coincident degree 465 are derived.

Figure 15:
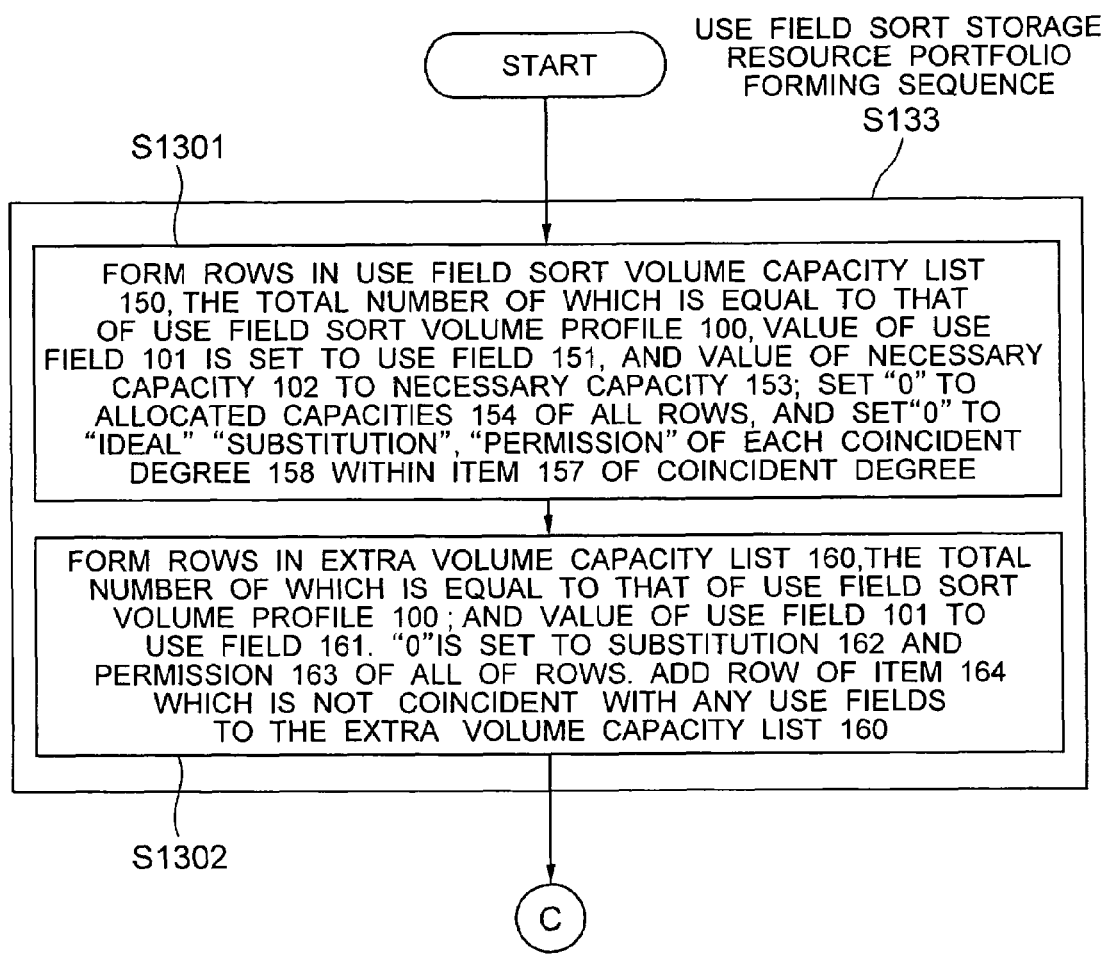
FIG. 15 is a flow chart for representing sequential flow operations for forming a use field sort storage resource portfolio in the first embodiment.
Figure 16:
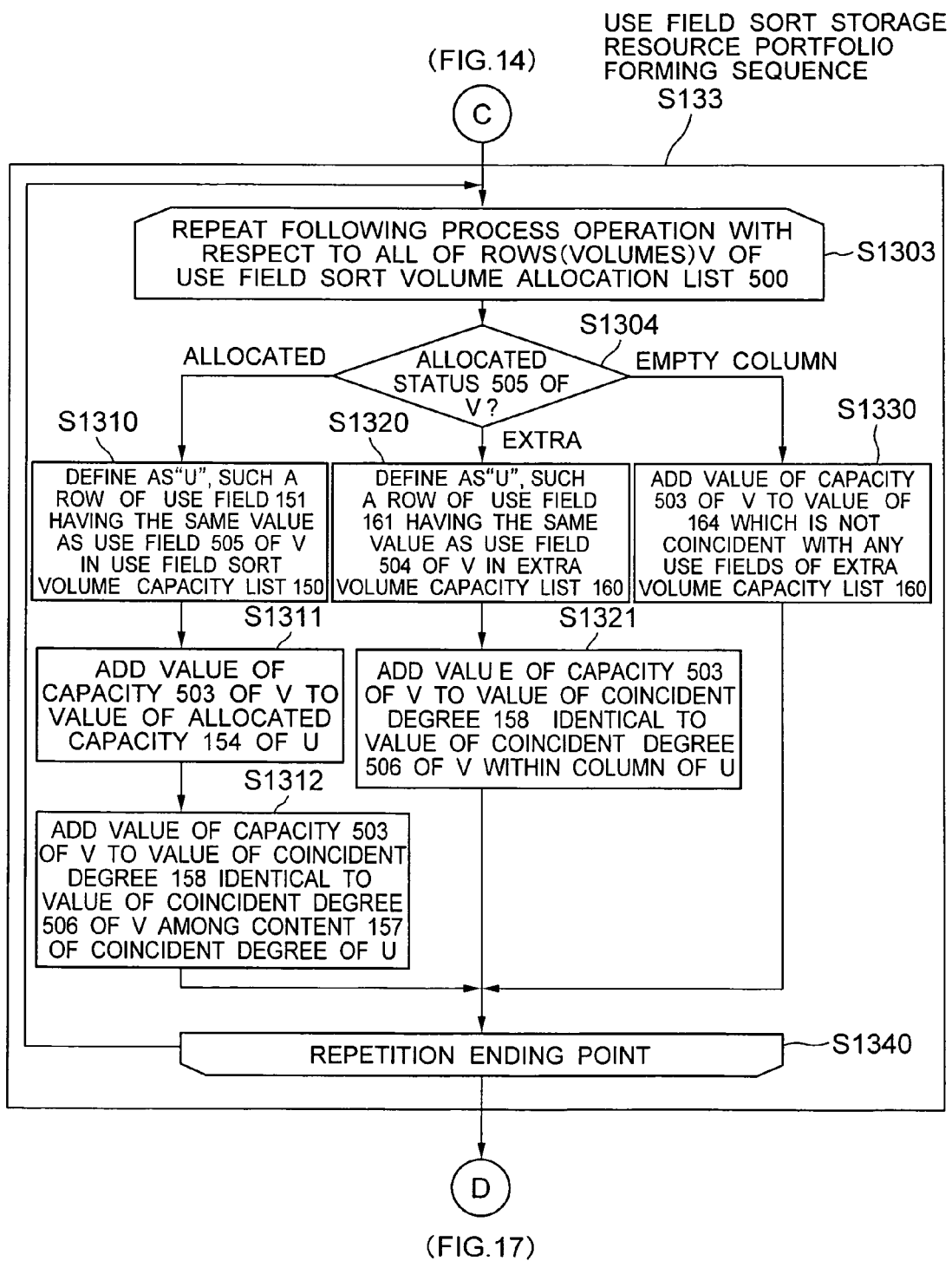
FIG. 16 is a flow chart for representing sequential flow operations for forming a use field sort storage resource portfolio in the first embodiment.
Figure 17:
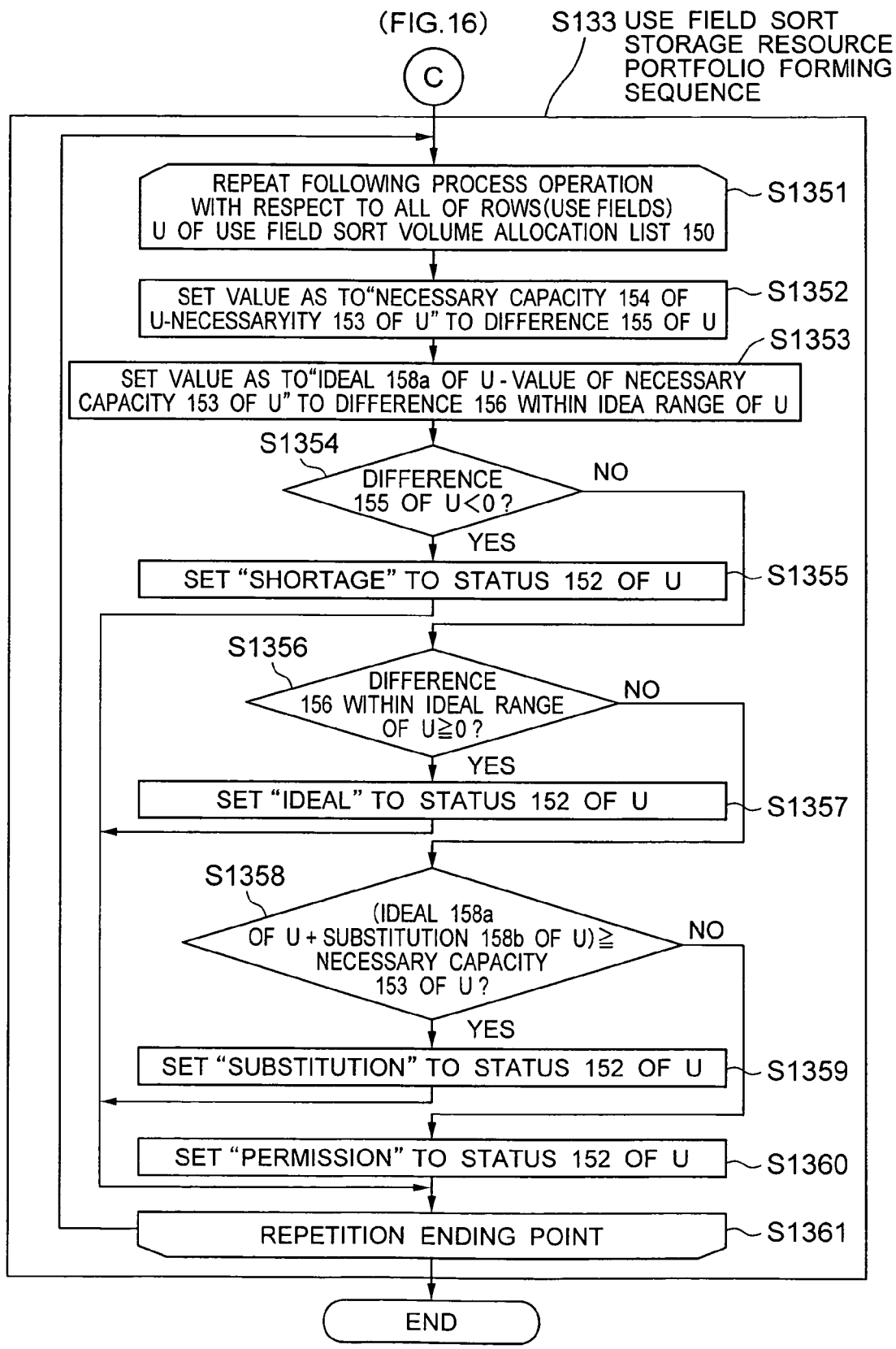
FIG. 17 is a flow chart for representing sequential flow operations for forming a use field sort storage resource portfolio in the first embodiment.

FIG. 15, FIG. 16, and FIG. 17 are flow charts for representing flow process operations as to the use field sort storage resource portfolio forming sequential operation S133 in the first embodiment. Referring now to FIG. 15, FIG. 16, FIG. 17 (referring properly to FIG. 1 through FIG. 6), a description is made of the use field storage resource portfolio forming sequential operation S133 of this first embodiment.

In this case, the use field sort storage resource portfolio forming sequential operation S133 corresponds to such a sequential operation that the use field sort storage resource portfolio 140 containing both the use field sort volume capacity list 150 and the extra volume capacity list 160 is formed from the use field sort volume allocation list 500.

In the use field sort storage resource portfolio forming sequential operation S133, the processing unit 340 firstly forms rows, the total number of which is equal to that of the use field 101 of the use field sort volume profile 100 in the use field sort volume capacity list 150, and sets the value of the use field 101 to the use field 151, and also sets the value of the necessary capacity 102 to the necessary capacity 153. Then, the processing unit 340 sets "0" to the allocated capacities 154 of all of the rows, and also, sets "0" to "ideal", "substitution", "permission" of each of the coincident degrees 158 of the item 157 of the coincident degree (step S1301). Next, the processing unit 340 forms plural rows, the total number of which is equal to that of the use fields 101 of the use field sort volume profile 100 in the extra volume capacity list 160, and sets the value of the use field 101 to the use field 161. Then, the processing unit 340 sets "0" to the substitutions 162 and the permissions 163 of all of the rows. Also, the processing unit 340 adds the row of the item 164 which is not coincident with any use field to the extra volume capacity list 160 (step S1302).

Then, the processing unit 340 repeatedly performs the below-explained process operation with respect to all of rows (volumes) V of the use field sort volume allocation list 500 (step S1303). In this case, the processing unit 340 judges a value of the allocation status 505 of V (step S1304).

In the case that the value of the allocated status 505 is "allocated" ("allocated" in step S1304), the processing unit 340 assumes as "U" a row of the use field 151 having the same value as that of the use field 504 of V in the use field sort volume capacity list 150 (step S1310), and adds the value of the capacity 503 of V to the value of the allocated capacity 154 of U (step S1311). Next, the processing unit 340 adds the value of the capacity 503 of V to the value of the coincident degree 158 which is the same value of the coincident degree 506 of V (step S1312). Thereafter, the process operation is returned to the step S1303 in which a next repetition process operation is carried out.

In the case that the value of the allocated status 505 is "extra" in the step S1304 ("extra" in step S1303), the processing unit 340 assumes as "U" a row of the use field 161 having the same value as that of the use field 504 of V in the extra volume capacity list 160 (step S1320), and adds the value of the capacity 503 of V to the value of the column of the same coincident degree as the coincident degree 506 of V within the columns of U (step S1321). Thereafter, the process operation is returned to the step S1303 in which a next repetition process operation is carried out.

When the value of the allocated status 505 is an empty column in the step S1304 ("empty column" in step S1304), the processing unit 340 adds the value of the capacity of V to the value of the item 164 which is not coincident with any use fields of the extra volume capacity list 160 (step 1330). Thereafter, the process operation is returned to the step S1303 in which a next repetition process operation is carried out.

When the repetition process operation defined from the step S1303 to the step S1340 is accomplished, subsequently, the processing unit 340 repeatedly performs the below-mentioned process operation as to all of rows (use fields) "U" of the use field sort volume capacity list 150 (step S1351). Firstly, the processing unit 340 sets such a value obtained by subtracting the value of the necessary capacity 153 of U from the value of the allocated capacity 154 of U to the difference 155 of U (step S1352). Next, the processing unit 340 sets such a value obtained by subtracting the value of the necessary capacity 153 of U from the value of the ideal 158a of U to the difference 156 of U within the ideal range (step S1353). In this case, the processing unit 340 judges as to whether or not the difference 155 of U is smaller than 0 (step S1354).

When the difference 155 of U is smaller than 0 ("YES" in step S1354), the processing unit 340 sets "shortage" to the status 152 of U (step s1355), and the process operation thereof is returned to the step S1351 in which a next repetition process operation is carried out. Also, when the difference 155 of U is larger than, or equal to 0 ("NO" in step S1354), the processing unit 340 judges the difference 156 of U in the ideal range (step S1356). When the difference 156 of U in the ideal range is larger than, or equal to 0 ("YES" in step S1356), the processing unit 340 sets "ideal" to the status 152 of U (step S1357), and the process operation thereof is returned to the step S1351 in which a next repetition process operation is carried out. Furthermore, when the difference 156 of U in the ideal range is smaller than 0 ("NO" in step S1356), the processing unit 340 judges as to whether or not a summation between the ideal 158a of U and the substitution 158b of U is larger than, or equal to the necessary capacity 153 of U (step S1358). In the case that this judgement can be established ("YES" in step S1358), the processing unit 340 sets "substitution" to the status 152 of U (step S1359), and the process operation thereof is returned to the step S1351 in which a next repetition process operation is carried out. In the case that this judgement cannot be established ("NO" in step S1358), the processing unit 340 sets "allocation" to the status 152 of U (step S1360), and the process operation thereof is returned to the step S1351 in which a next repetition process operation is carried out. After the repetition process operation defined from the step S1351 to the step S1361 is accomplished, the use field sort storage resource portfolio forming sequential operation S133 is ended.

Figure 18:
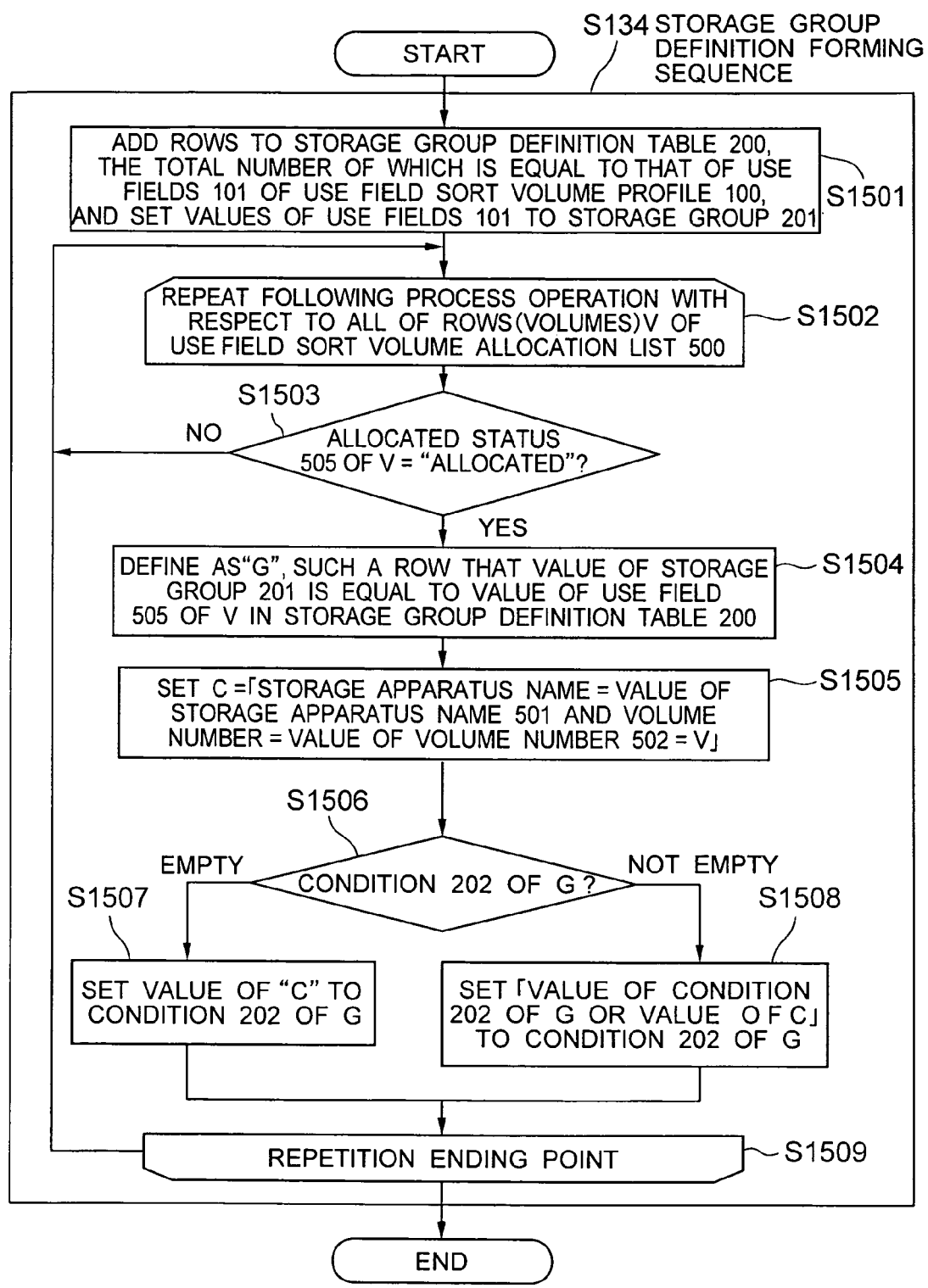
FIG. 18 is a flow chart for explaining storage group definition forming sequential flow operations in the first embodiment.

FIG. 18 is a flow chart for explaining flow operations as to the storage group definition forming sequential operations in the first embodiment. Referring now to FIG. 18 (referring properly to FIG. 1 to FIG. 6), the storage group definition forming sequence S134 of this first embodiment is explained.

The storage group definition forming sequence S134 corresponds to such a sequential operation for producing a storage group definition table 200 from the use field sort volume allocation list 500.

In the storage group definition forming sequence S134, the processing unit 340 firstly adds rows whose total number is equal to the total number of use fields 101 of the use field sort volume profile 100 to the storage group definition table 200, and sets the values of the use fields 101 to the storage group 201 (step S1501). Next, the processing unit 340 repeatedly performs the below-mentioned process operations with respect to all of the rows (volumes) "V" of the use field sort volume allocation list 500 (step S1502). Firstly, the processing unit 340 judges as to whether or not the value of the allocated status 505 of V is "allocated" (step S1503). When the value of the allocated status 505 of V is not "allocated" ("NO" in step S1503), the process operation is returned to the step S1502 in which a next repetition process operation is carried out.

When the value of the allocated status 505 of V is equal to "allocated" ("YES" in step S1503), the process operation defines as "G" such a row that the value of the storage group 201 is the same as the value of the use field 504 of V in the storage group definition table 200 (step S1504), and defines "C" as [storage apparatus name=value of storage apparatus name 501 of V AND volume number=value of volume number 502 of V] (step S1505). Then, the processing unit 340 judges the condition 202 of G (step S1506).

If the condition 202 of G is empty ("empty" in step S1506), then the value of C is set to the condition 202 of G (step S1507). If the condition 202 of G is not empty ("not empty" in the step S1506), then [value of condition 202 of G OR value of C] is set to the condition 202 of G (step S1508). After the repetition process operation defined from the step S1502 to the step S1509 is ended, the storage group definition forming sequence S134 is accomplished.

Figure 19:
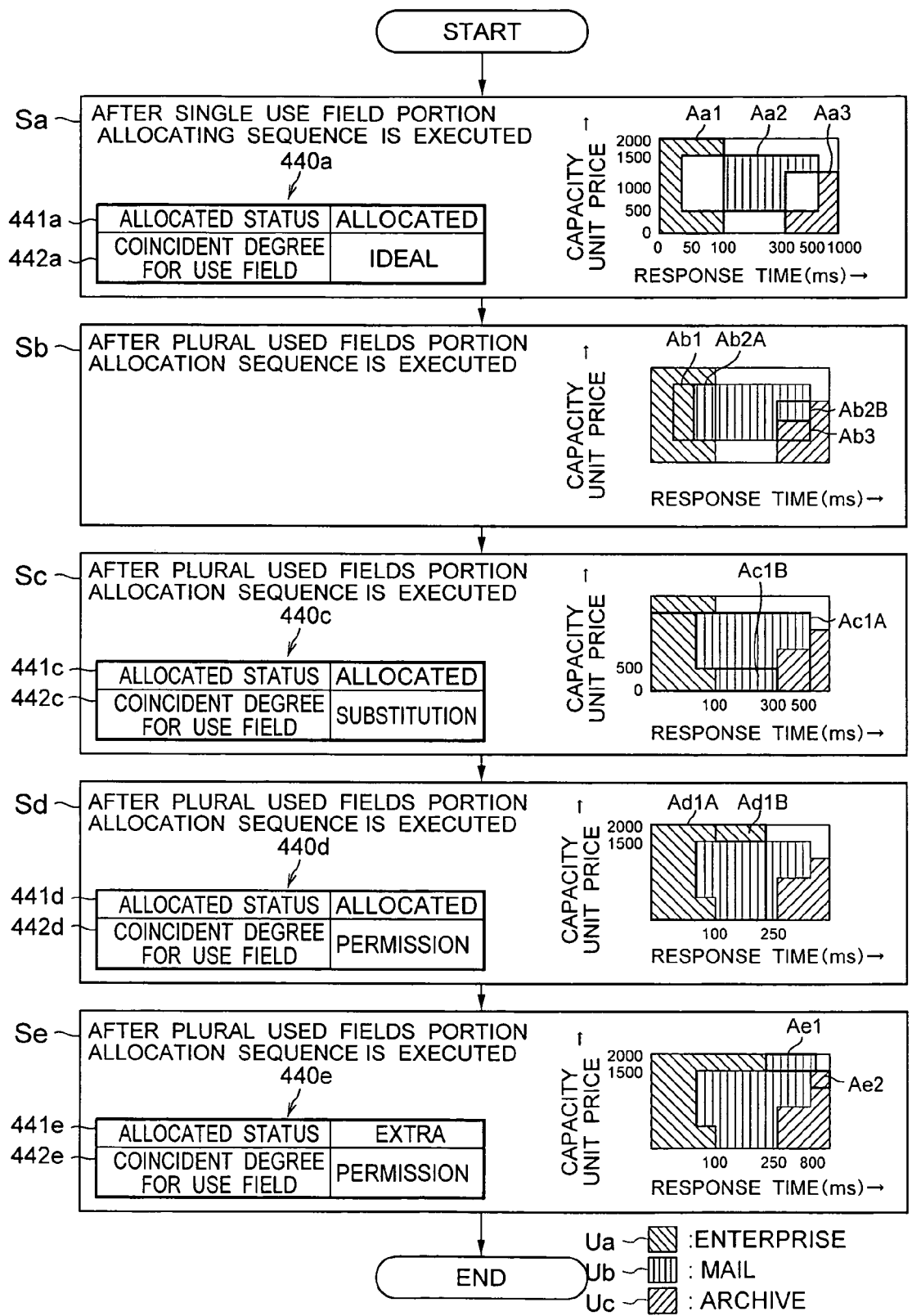
FIG. 19 is a diagram for indicating a change in dividing conditions of storage resources in the use field sort volume allocation sequential operations in the first embodiment.

FIG. 19 is a diagram for showing a change in dividing conditions of storage resources in the use field sort volume allocation sequence in the first embodiment. Referring now to FIG. 19 (referring properly to FIG. 1 through FIG. 6), a description is made of the change in the dividing conditions of the storage resources in the use field sort volume sequence S131 of this first embodiment.

Figure 31:
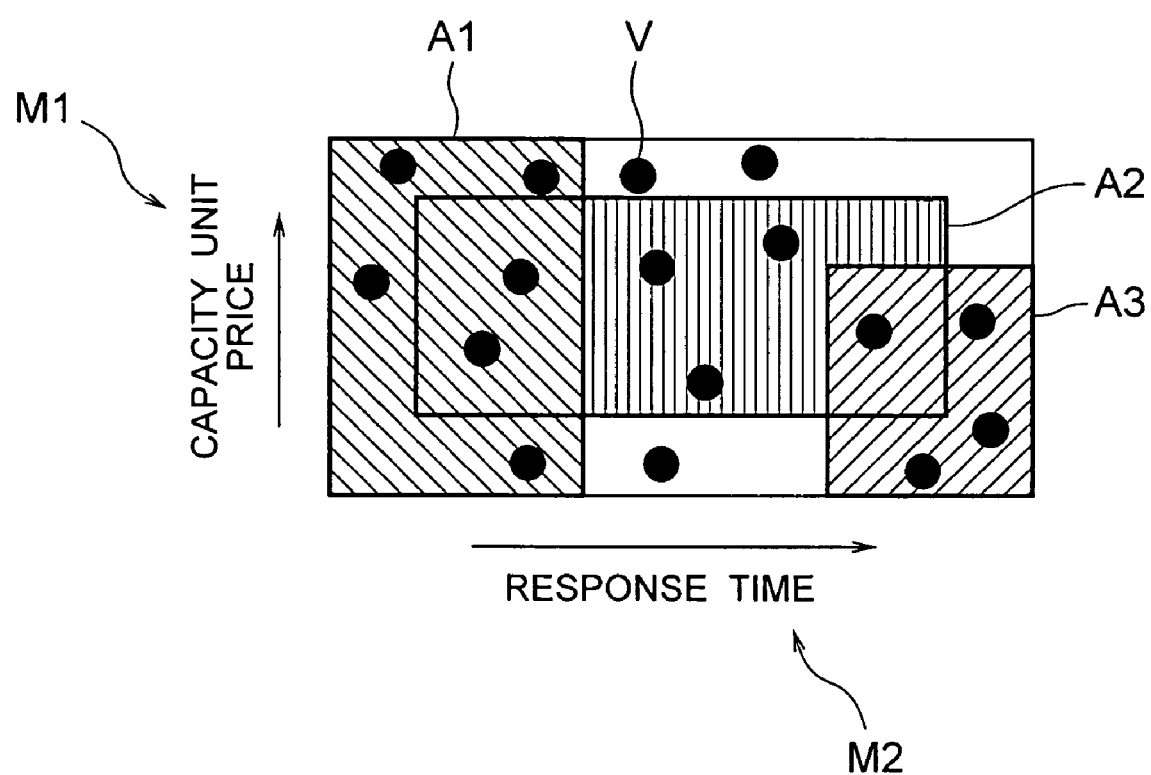
FIG. 31 is a graph for graphically representing the dividing conditions of the storage resources in the conventional technique.

In this case, an example as to a change in the use field sort volume allocation work status 440 in the use field sort volume allocation sequence S131, and a change in the volume allocation list 500 are represented in a similar graph to that of FIG. 31. As indicated in FIG. 19, a use field "Ua" shows a range of volumes which are allocated to a use field "enterprise"; a use field "Ub" indicates a range of volumes which are allocated to a use field "mail"; and a use field "Uc" shows a range of volumes which are allocated to a use field "archive." It should be understood that since the volumes are not mapped onto the graphs in FIG. 19, points indicative of the volumes on the graphs are omitted.

Such a status that the processing unit 340 starts the use field sort volume allocation sequence S131 and accomplishes the process operation of the single use field portion allocation sequence S433 is represented in a status "Sa." As indicated in the status "Sa", an allocated status 441a of the use field sort volume allocation work status 440a corresponds to "allocated", and a coincident degree 442a to the use field corresponds to "ideal." This shows such a status that while the volume characteristic whose coincident degree 106 is "ideal" is employed, a use field is allocated to a volume. Based upon the single use field portion allocation sequence S433, the use field is allocated to such a volume suitable only for one use field. As a consequence, among the volumes belonging to a range "Aa1" suitable for the use field "enterprise", such a volume which is present in a portion that is not overlapped with other ranges has been allocated to the use field "enterprise" (value of use field 463 of work-purpose volume characteristic table 460 becomes "enterprise"). Such a range where the range Aa1 suitable for the use field "enterprise" is overlapped with a range Aa2 suitable for the use field "mail" is not allocated to the use field "enterprise", but also to the use field "mail." Such a range where the range Aa2 suitable for the use field "mail" is overlapped with a range Aa3 suitable for the use field "archive" is not allocated to the use field "mail", but also to the use field "archive."

Subsequently, when the processing unit 340 executes the plural use fields common portion allocation sequence S434, as shown in a status "Sb", volumes of the range suitable for a plurality of use fields are allocated to any of the use fields. The status Sb shows such an example that the dividing method 411 of the common portion of the use field sort volume allocation policy table 110 corresponds to the "equal-dividing" method. For instance, a range of volumes belonging to both the range Aa1 suitable for the use field "enterprise" and the range Aa2 suitable for the use field "mail" is allocated to any of the use fields in such a manner that a total capacity of the volumes allocated to the use field "enterprise" and a total capacity of the volumes allocated to the use field "mail" are equally divided. In this case, the volumes are equally divided in such a way that a range "Ab1" where a response time is small constitutes the use field Ua, and a range "Ab2A" where a response time is large constitutes the use field Ub. Also, the volumes are equally divided in such a way that a range "Ab2A" where a capacity unit is large constitutes the use field Ub, and a range "Ab3" where a capacity unit is small constitutes the use field Uc. It should also be noted that the equi-dividing method is not limited only to the above-explained method.

Next, a status "Sc" indicates such a post status that after the use field sort volume allocation work status 440a had been updated to a use field sort volume allocation work status 440c by the status updating sequence S435, the processing unit 340 again executed the single use field portion allocating sequence S433 and the plural use fields common portion allocating sequence S434. As shown in the status "Sc", while the allocation status 441c of the use field sort volume allocation work status 440c remains as "allocated", the value of the coincident degree 442c to the use field has been updated to "substitution." Thus, the status Sc corresponds to such a status that while employing a volume characteristic whose coincident degree 106 is "substitution", a use field has been allocated to a volume. For example, a range suitable for such a volume characteristic that a coincident degree of the use field "mail" is "substitution" corresponds to a range "Ac1A", and a range "Ac1B" which is not allocated to any of the use fields has been allocated to the use field Ub within the range "Ac1A." In this example, since the allocated capacity 452 of the use field "archive" can satisfy the necessary capacity 102, such a volume suitable for the coincident degree "substitution" of the use field "archive" is not allocated to the use field "archive", and the processing unit 340 judges that there is no volume suitable for the coincident degree "substitution" of the use field "enterprise."

Further, a status "Sd" indicates such a post status that after the use field sort volume allocation work status 440c had been updated to a use field sort volume allocation work status 440d by the status updating sequence S435, the processing unit 340 again executed the single use field portion allocating sequence S433 and the plural use fields common portion allocating sequence S434. As shown in the status "Sd", while the allocated status 441d of the use field sort volume allocation work status 440d remains as "allocated", the value of the coincident degree 442d to the use field has been updated to "permission." Thus, the status "Sd" corresponds to such a post status that while employing a volume characteristic whose coincident degree 106 is "permission", a use field has been allocated to a volume. For example, a range suitable for such a volume characteristic that a coincident degree of the use field "enterprise" is "permission" corresponds to a range "Ad1A", a range "Ad1B" which is not allocated to any of the use fields has been allocated to the use field Ua within the range "Ad1A." In this example, since the allocated capacity 452 of the use field "mail" and the allocated capacity 452 of the use field "archive" can satisfy the necessary capacity 102, the processing unit 340 judges that there is no volume suitable for the coincident degree "permission" of these use fields.

A status "Se" represents such a post status that as explained above, the status updating sequence S435, the single use field portion allocating sequence S433, the plural use fields common portion allocating sequence S434 are repeatedly carried out; the use field sort volume allocation work status 440a is allocated to the use field sort volume allocation work status 440d; the allocated status 441e becomes "extra" and the coincident degree 442e to the use field becomes "permission", and the execution of the plural use fields common portion allocation sequence S434 is accomplished. This is such a status that while employing the volume characteristic where the coincident degree 106 is "permission", the processing unit 340 judges that an extra volume is suitable for which use field with respect to the extra volumes which are not allocated to any of the use fields, sets "extra" to the allocated status 464 of the work-purpose volume characteristic table 460, and then, completes a process operation for setting a use field to the use field 463.

For instance, among the volumes which are not allocated to any of these use fields, a range "Ae1" which can satisfy the volume characteristic of the coincident degree "permission" of the use field "mail" is assumed as an extra volume which can be utilized in the use field "mail." Finally, this extra volume constitutes such a volume whose capacity is described in the permission 163 of the use field 161 "mail" of the extra volume capacity list 160. Also, among the volumes which are not allocated to any of these use fields, a range "Ae2" which can satisfy the volume characteristic of the coincident degree "permission" of the use field "archive" is assumed as an extra volume which can be utilized in the use field "archive." Finally, this extra volume constitutes such a volume whose capacity is described in the permission 163 of the use field 161 "archive" of the extra volume capacity list 160. In this case, such a status is omitted that among the volumes which are not allocated to any of the use fields, since there is no such a volume capable of satisfying the volume characteristics whose coincident degrees 106 are "ideal" and "substitution", the allocated status 441 of the use field sort volume allocation work condition 440 is "extra", and the coincident degrees 442 to the use field are "ideal" and "substitution."

As previously explained, the storage system of the first embodiment can form the use field volume allocation list which indicates that the volumes are allocated to one use field, or are not allocated to any of these use fields. Since such a use field sort volume allocation list is formed, the storage system of this first embodiment can divide the storage resources while the volumes are not overlapped with each other among the plural use fields.

Furthermore, in the use field sort volume profile, the necessary capacities indicative of the necessary capacities in the respective use fields, and the volume characteristics suitable for the use fields can be described, depending upon the coincident degrees such as "ideal", "substitution", and "permission." For instance, to the coincident degree of the ideal, such a volume characteristic which is most suitable for the use field is described. To the coincident degree of the substitution, such a volume characteristic is described which is suitable for the use field, but has a higher level than the required volume characteristic. To the coincident degree of the permission, such a volume characteristic is described. That is, when a volume suitable for the use field becomes short, as compared with the necessary capacity, although the level is lower than the necessary volume characteristic, this volume characteristic owns the compromisable level. Then, when a volume is allocated to a use field in the storage resource dividing process operation, the use field is firstly allocated to the volume by employing the volume characteristic which is described in the coincident degree of the ideal.

In this case, if a total capacity of the volumes allocated to the use field becomes short, as compared with the necessary capacity, then a use field is allocated to the volume by employing the volume characteristic described in the coincident degree of "substitution." Furthermore, even if a total capacity of the volumes allocated to the use field still becomes short, as compared with the necessary capacity, then a use field is allocated to the volume by employing the volume characteristic described in the coincident degree of "permission."

Moreover, if storage resources are subdivided by employing volume characteristics representative of such physical storage structures as storage apparatus names, then there is no possibility that volumes are suitable for a plurality of use fields. However, when such a trend is considered that a total capacity of volumes owned by a single storage apparatus is more increased very recently, a total capacity of volumes suitable for one use field becomes very large, as compared with a capacity required for a use field, and therefore, there are some possibilities that storage resources which are not used are increased. Further, there is no restriction that all of volumes of a storage apparatus always own the same volume characteristics. Therefore, there are some cases that the storage resources are not always properly divided in the unit of the storage apparatus. Also, if a volume is directly designated based upon such a performance volume characteristic as a response time and a transfer speed rather than a volume characteristic indicative of such a physical storage structure as a storage apparatus name and a RAID structure, then a user of the storage system can simply grasp the volume. In accordance with this first embodiment, while the present invention is not limited only to the volume characteristic indicative of the physical storage structure, even when any of the volume characteristics are employed, the storage resources can be subdivided based upon the use field sort, and the volumes are not overlapped with each other among a plurality of use fields.

Also, the storage group definition forming sequence is provided by which while the use field sort volume allocation list is employed, the conditions for specifying the respective volumes and the sets of the volumes allocated to the respective use fields are calculated, and then, the storage group definition for defining the storage group based upon the conditions of the volume characteristics is formed. As a result, even in the conventional storage system, such a result that the storage resources are subdivided depending upon the use field can be utilized.

Also, in storage systems employed in enterprises, application programs are increased, decreased, and substituted in response to changes in business environments. As a consequence, a capacity required for a certain use field may be changed, and a volume characteristic suitable for a use field may be changed. In this specification, the above-explained "change" will be referred to as "change in use fields." On the other hand, since storage apparatus are increased, decreased, substituted, and structural-changed, there are some possibilities that amounts and qualities of storage resources are changed, namely, total capacities and characteristics of volumes present in storage systems are changed. Such a change will be referred to as "change in storage resources" in this specification.

When such a "change in use fields" and a "change in storage resources" are present, there are some possibilities that a total capacity of volumes allocated to a certain use field may become short with respect to a necessary capacity. In such a case, it is desirable to change a subdivision of storage resources in a flexible manner, for example, volumes allocated to other use fields are reallocated to the storage use field. In accordance with the first embodiment, in the case that a total capacity of volumes allocated to a use field becomes short, as compared with a necessary capacity, due to a change in use fields and a change in storage resources, the total capacity of the volumes which are required for the use field can be satisfied. As a consequence, the subdivision of the storage resources can be changed in a flexible manner in correspondence with the change in use fields and the change in storage resources. Also, the subdivision of the storage resources can be changed in a flexible manner in correspondence with the change in capacities required for use fields, and the change in volume characteristics suitable for the use fields.

Second Embodiment

Next, a storage system according to a second embodiment of the present invention will now be described. This second embodiment is featured as follows: That is, when a use field allocated to a volume is changed due to changes in a use field sort volume profile 100 and a volume characteristic table 120, data of the volume are rearranged in response to these changes. It should be understood that the same reference numerals shown in the first embodiment will be employed as those for denoting the same, or similar structures of the second embodiment, and explanations thereof are omitted.

Figure 20:
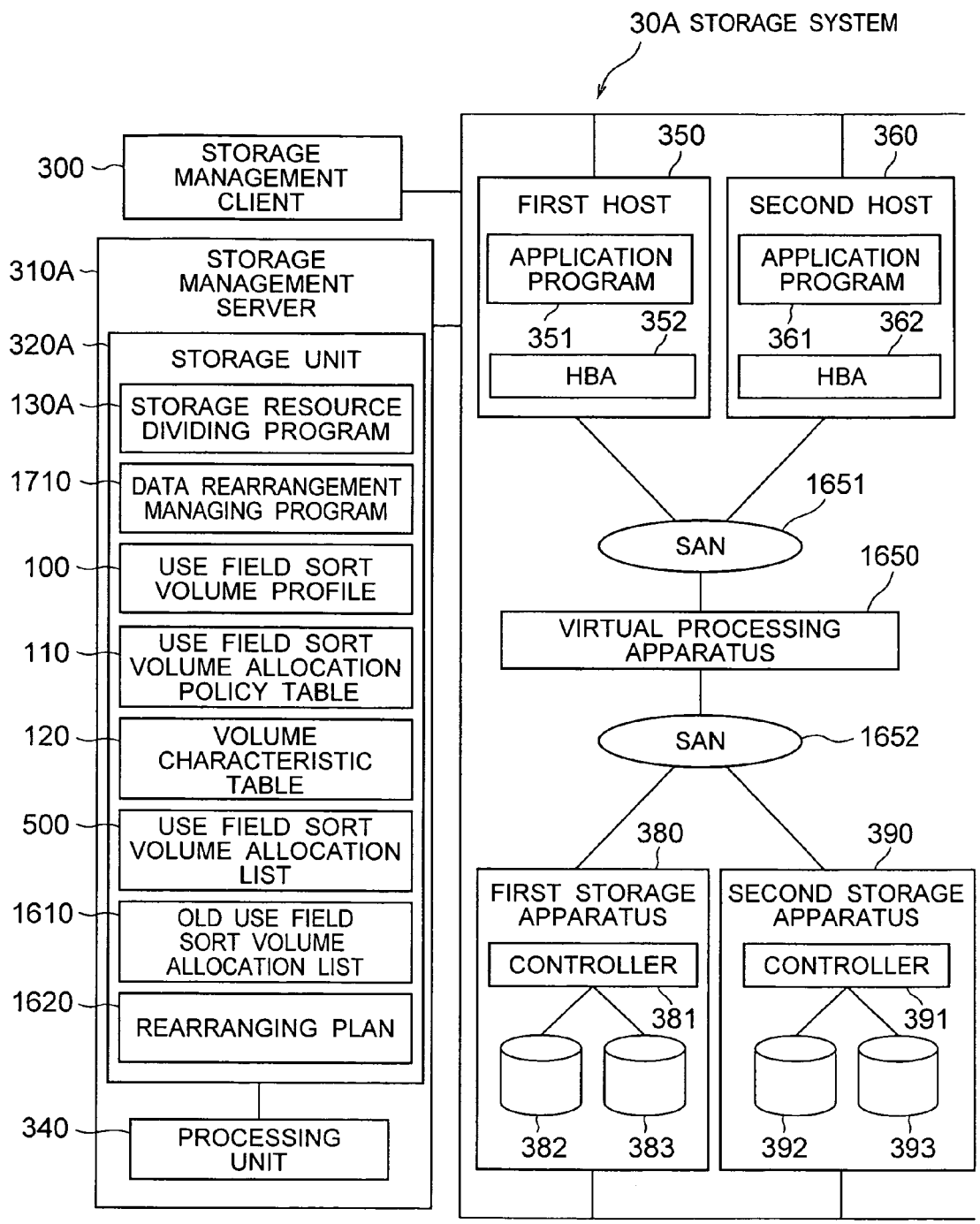
FIG. 20 is a structural diagram of a storage system according to a second embodiment of the present invention.

FIG. 20 is a structural diagram for showing a storage system 30A according to the second embodiment.

The storage system 30A is arranged in such a manner that the SAN 370 of the storage system 30 according to the first embodiment is subdivided into an SAN 1651 on the side of a host and another SAN 1652 on the side of the storage apparatus. The SAN 1651 and the SAN 1652 are connected to each other by a virtual processing apparatus 1650.

A storage management server 310A has stored a storage resource dividing program 130A, a data rearrangement managing program 1710, an old use field sort volume allocation list 1610, and a rearranging plan 1620 in a storage unit 320A. Since other programs and data stored in the storage unit 320A are similar to those of the first embodiment, explanations thereof are omitted.

The old use field sort volume allocation list 1610 is used so as to store thereinto such a use field sort volume allocation list 500 which has been formed before the use field sort volume profile 100 and the volume characteristic table 120 were changed. The virtual processing apparatus 1650 is, for example, the internal processing apparatus described in the patent publication 3 (JP-A-2003-345522). The virtual processing apparatus 1650 supports a data rearrangement between the storage apparatus by showing both a volume of a first storage apparatus 380 and a volume of a second storage apparatus 390 as a volume of one virtual storage apparatus to a first host 350 and a second host 360. The data rearrangement managing program 1710 corresponds to a portion for controlling a rearrangement of data, and instructs the rearrangement of the data to the virtual processing apparatus 1650 based upon the rearranging plan 1620. The storage resource dividing program 130A corresponds to a program which is executed by the processing unit 340. A detailed explanation of this storage resource dividing program 130A will be made later.

Figure 21:
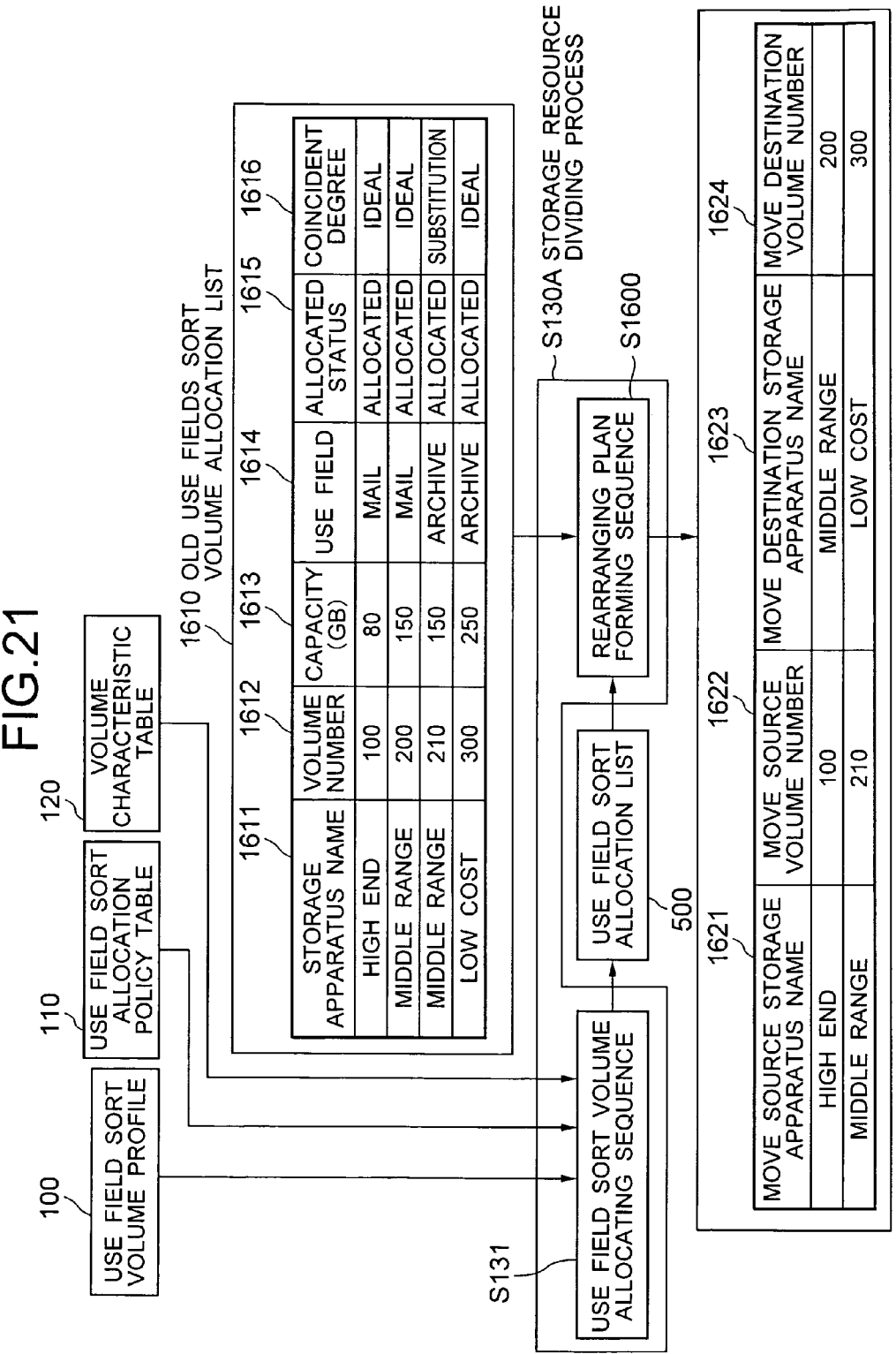
FIG. 21 is a diagram for indicating major structural elements and process flow operations according to the second embodiment.

FIG. 21 is a diagram for representing major structural elements and process flow operations in the storage system of the second embodiment. Referring now to FIG. 21 (referring properly to FIG. 20), the major storage elements and the process flow operations according to this second embodiment are explained.

Similar to the use field sort volume allocation list 500, the old use field sort volume allocation list 1610 owns a storage apparatus name 1611, a volume number 1612, a capacity 1613, a use field 1614, an allocated status 1615, and a coincident degree 1616. The rearranging plan 1620 contains a description related to a move source volume of data and a description related to a move destination volume of data. A move source storage apparatus name 1621 indicates a storage apparatus name which constitutes the move source of the data; a move source volume number 1622 indicates a number for identifying a volume which constitutes the move source of the data; a move destination storage apparatus name 1623 represents a storage apparatus name which constitutes the move destination of the data; and a move destination volume number 1624 indicates a number for identifying a volume which constitutes the move destination of the data. A rearrangement plan forming sequence S1600 corresponds to such a sequence that based upon the use field sort volume allocation list 500 and the old use field sort volume allocation list 1610, a volume whose use field is changed, a move source of data, a move destination of data re acquired in response to this change so as to form the rearranging plan 1620. A storage resource dividing process operation S130A is realized by that the storage resource dividing program 130A is executed by the processing unit 340. This storage resource dividing process operation S130A contains the use field sort volume allocating sequence S131 as explained in the first embodiment, and further, a rearrangement plan forming sequence S1600.

Figure 22:
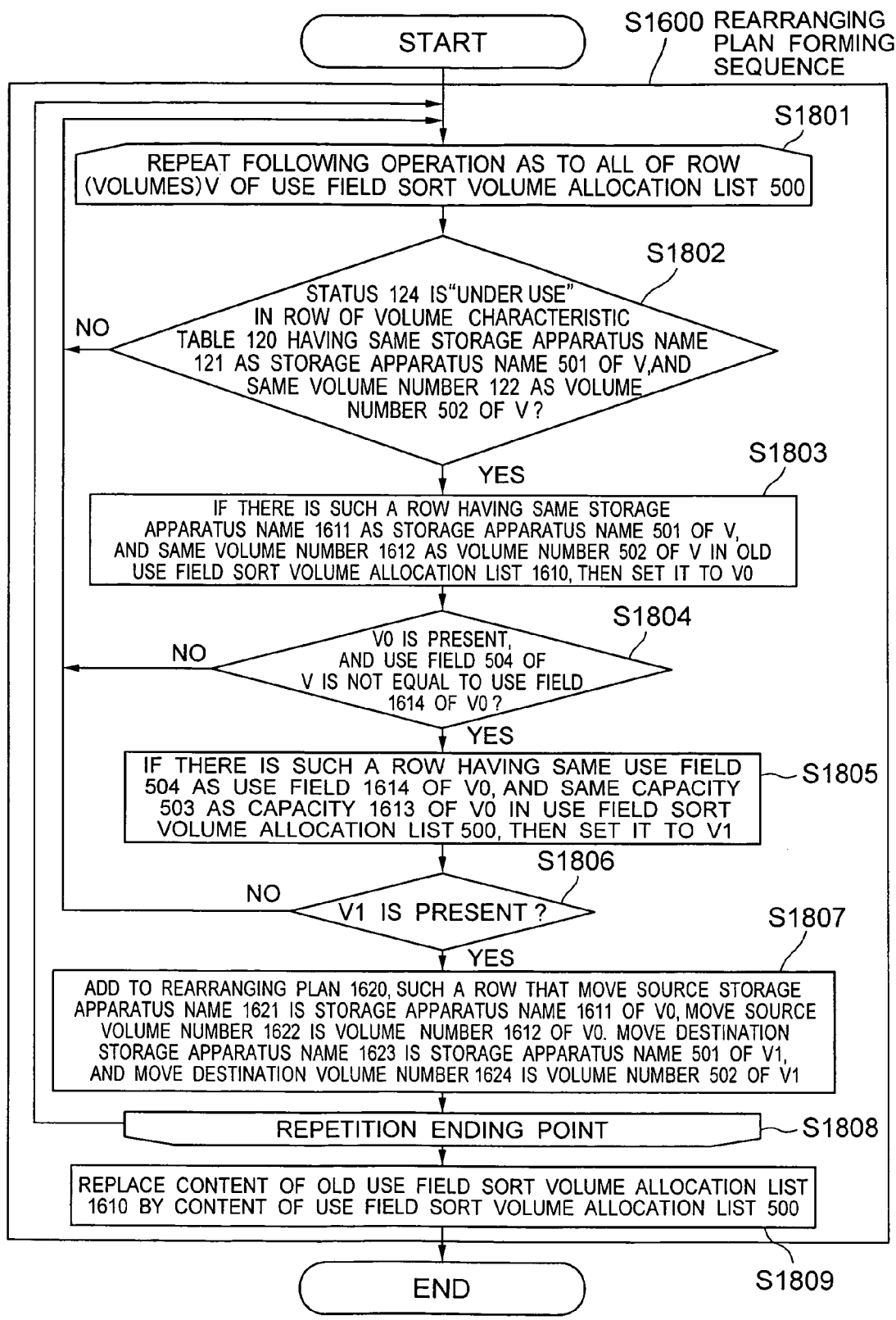
FIG. 22 is a flow chart for representing sequential flow operations for forming a rearrangement plan in the second embodiment.

FIG. 22 is a flow chart for indicating flow operations as to the rearrangement plan forming sequence S1600 in the second embodiment. Referring now to FIG. 22 (referring properly to FIG. 20, or FIG. 21), a description is made of the rearrangement plan forming sequence S1600.

Firstly, the processing unit 340 repeatedly executes the below-mentioned process operation with respect to all of rows (volumes) "V" of the use field sort volume allocation list 500 (step S1801). Next, the processing unit 340 judges as to whether or not a value of the status 124 is "under use" in a row of the volume characteristic table 120 which owns the same storage apparatus name 121 as the storage apparatus name 501 of V, and the same volume number 122 as the volume number 502 of V (step S1802). If the value of the status 124 is not "under use" ("NO" in step S1802), then the process operation of the processing unit 340 is returned to the step S1801 in which a next repetition process operation is carried out. When the value of the status 124 is "under use" ("YES" in step S1802), if there is such a row which owns a storage apparatus name 1611 identical to the storage apparatus name 501 of V and a volume number 1612 identical to the volume number 502 of V in the old use field sort volume allocation list 1610, then the processing unit 340 changes this row into "V0" (step S1803).

In this case, the processing unit 340 judges as to whether or not "V0" is present and the use field 504 of V is different from a use field 1614 of V0 (step S1804). In the case that this judgement cannot be established ("NO" in step S1804), then the process operation of the processing unit 340 is returned to the step S1801 in which a next repetition process operation is carried out. In the case that this judgement can be established ("YES" in step S1804), the processing unit 340 executes steps subsequent to the step S1805. If there is such a row which owns the same use field 504 as the use field 1614 of V0 and the same capacity 503 as a capacity 1603 of V0 in the use field sort volume allocation list 500, then the processing unit 340 changes this row to "V1" (step 1805).

In this case, the processing unit 340 judges as to whether or not V1 is present (step S1806). If V1 is not present ("NO" in step S1806), then the process operation of the processing unit 340 is returned to the step S1801 in which a next repetition process operation is carried out. When V1 is present ("YES" in step S1806), the processing unit 340 adds such a row to the rearranging plan 1620, in which a move source storage apparatus name 1621 is the storage apparatus name 1611 of V0; the move source volume number 1622 is the volume number 1612 of V0; the move destination storage apparatus name 16234 is the storage apparatus name 501 of V1; and the move destination volume number 1624 is the volume number 502 of V1 (step S1807), and then, the process operation of the processing unit 340 is returned to the step S1801 in which a next repetition process operation is carried out. After the repetition process operation defined from the step S1801 to the step S1808 is accomplished, the content of the old use field sort volume allocation list 1610 is substituted by the content of the use field sort volume allocation list 500 (step S1809). Then, the rearrangement plan forming sequence S1600 is ended.

As previously explained, in response to the change in the use fields and the change in the storage resources, a use field allocated to a certain volume may be changed. In the case that data is present in this volume, the following status may occur. That is, the use field of this data is not made coincident to the use field allocated to this volume. In accordance with the storage system 30A of the second embodiment, this data can be rearranged to such a volume which is fitted to the use field in order to avoid the above-described status.

Third Embodiment

Next, a storage system 30B according to a third embodiment of the present invention will now be described. This storage system 30B is featured by having an object to analyze storage resources for an improvement, and by showing such a volume which is not fitted to a use field and such a storage apparatus which should be newly provided. It should be understood that the same reference numerals shown in the first embodiment, or the second embodiment will be employed as those for denoting the same, or similar structures of the third embodiment, and explanations thereof are omitted.

Figure 23:
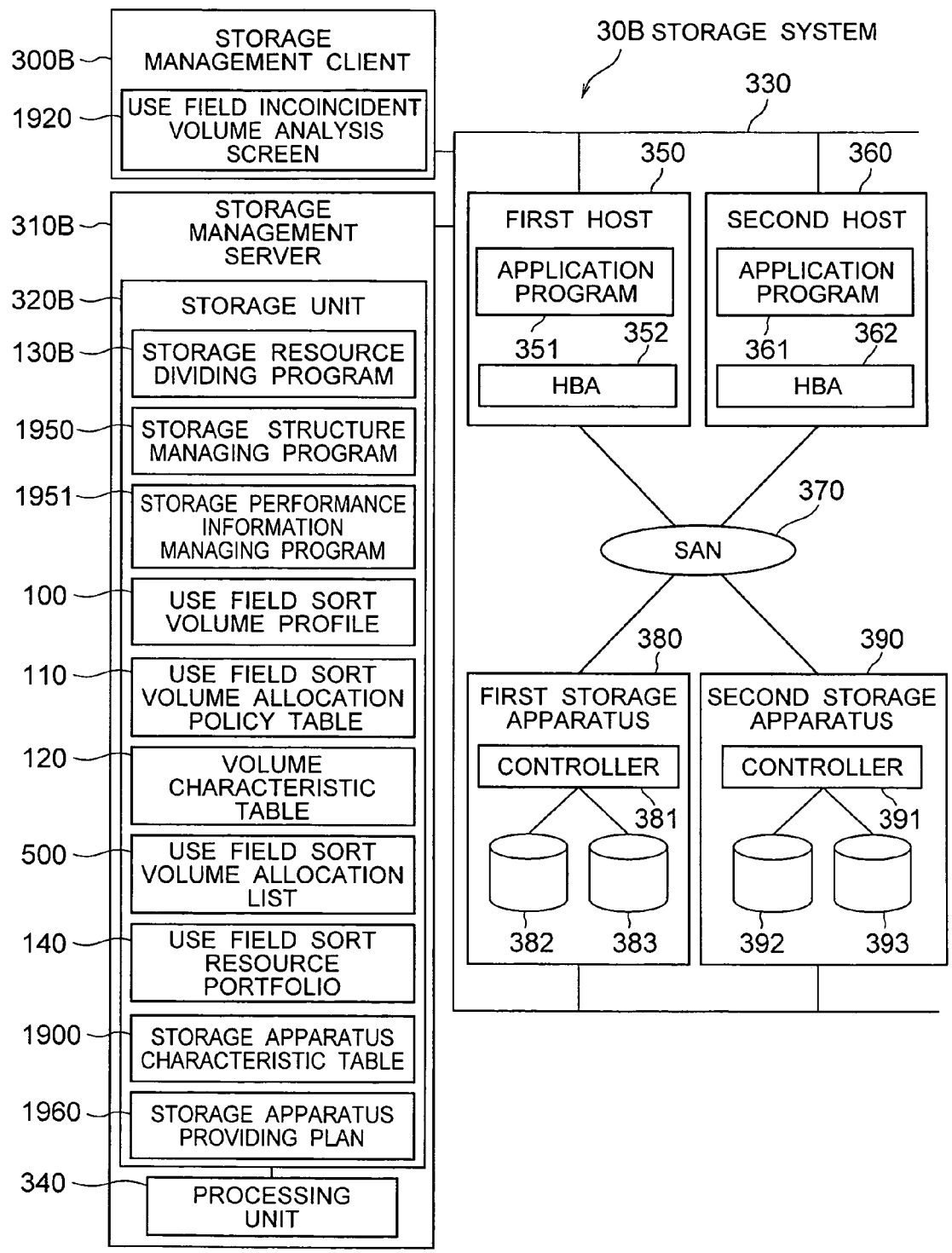
FIG. 23 is a structural diagram of a storage system according to a third embodiment of the present invention.

FIG. 23 is a structural diagram for indicating an arrangement of the storage system 30B according to the third embodiment.

The storage system 30B is arranged by that the storage management client 300B in the first embodiment contains a use field incoincident volume analysis screen 1920.

A storage management server 310B has stored a storage resource dividing program 130B, a storage structure managing program 1950, a storage performance information managing program 1951, a storage apparatus characteristic table 1900, and a storage apparatus providing plan 1960 in a storage unit 320B. Since other programs and data stored in the storage unit 320B are similar to those of the first embodiment, or the second embodiment, explanations thereof are omitted.

The storage structure managing program 1950 corresponds to a program which is executed by the processing unit 340, and realizes such a storage structure managing system which acquires and managed structures and failure information of storage apparatus. This storage structure managing system may refer to structural information and failure information related to a sub-system and an SAN from the storage management client 300B. The storage performance information managing program 1951 corresponds to such a program which is executed by the processing unit 340, and realizes a storage performance information managing system which collects and manages performance information of storage apparatus. This storage performance information managing system may refer to performance information related to a sub-system, a host, and an SAN from the storage management client 300B. The storage resource dividing program 130B corresponds to such program which is executed by the processing unit 340, and a detailed explanation as to the storage resource dividing program 130B will be made later.

The storage apparatus characteristic table 1900 describes therein volume characteristics of storage apparatus. The storage apparatus providing plan 1960 represents a candidate for such a storage apparatus which should be provided in order that a total capacity of volumes suitable for a use field can satisfy a necessary capacity. The use field incoincident volume analysis screen 1920 provides an indication as to a list for volumes which are not suitable for any use fields and a ratio of these volumes depending upon storage apparatus; and also provides a means for initiating screens of the storage structure managing program 1950 and the storage performance information managing program 1951 in order to investigate a cause why the volumes are not suitable for any use fields.

Figure 24:
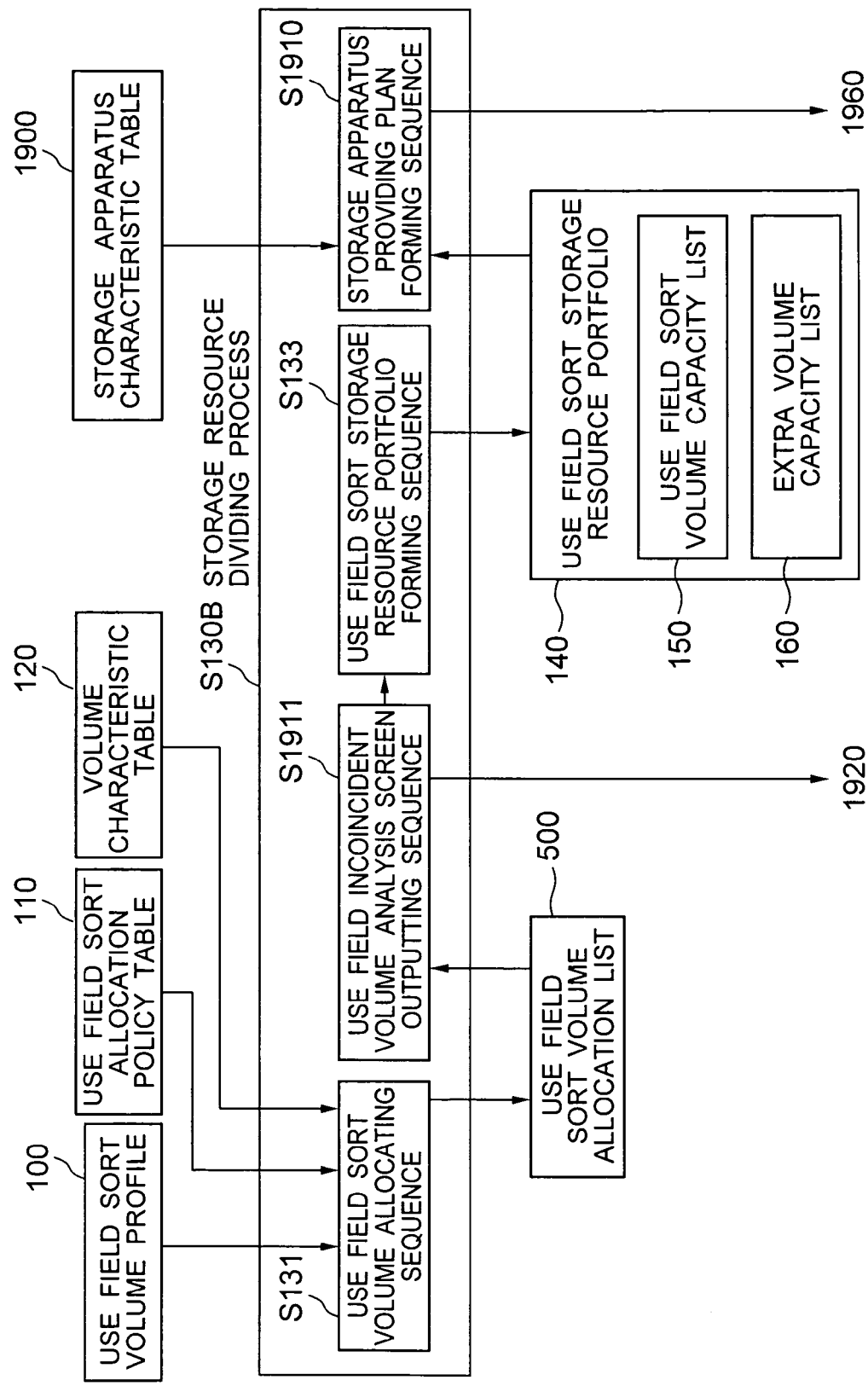
FIG. 24 is a diagram for indicating major structural elements and process flow operations according to the third embodiment.
Figure 25:
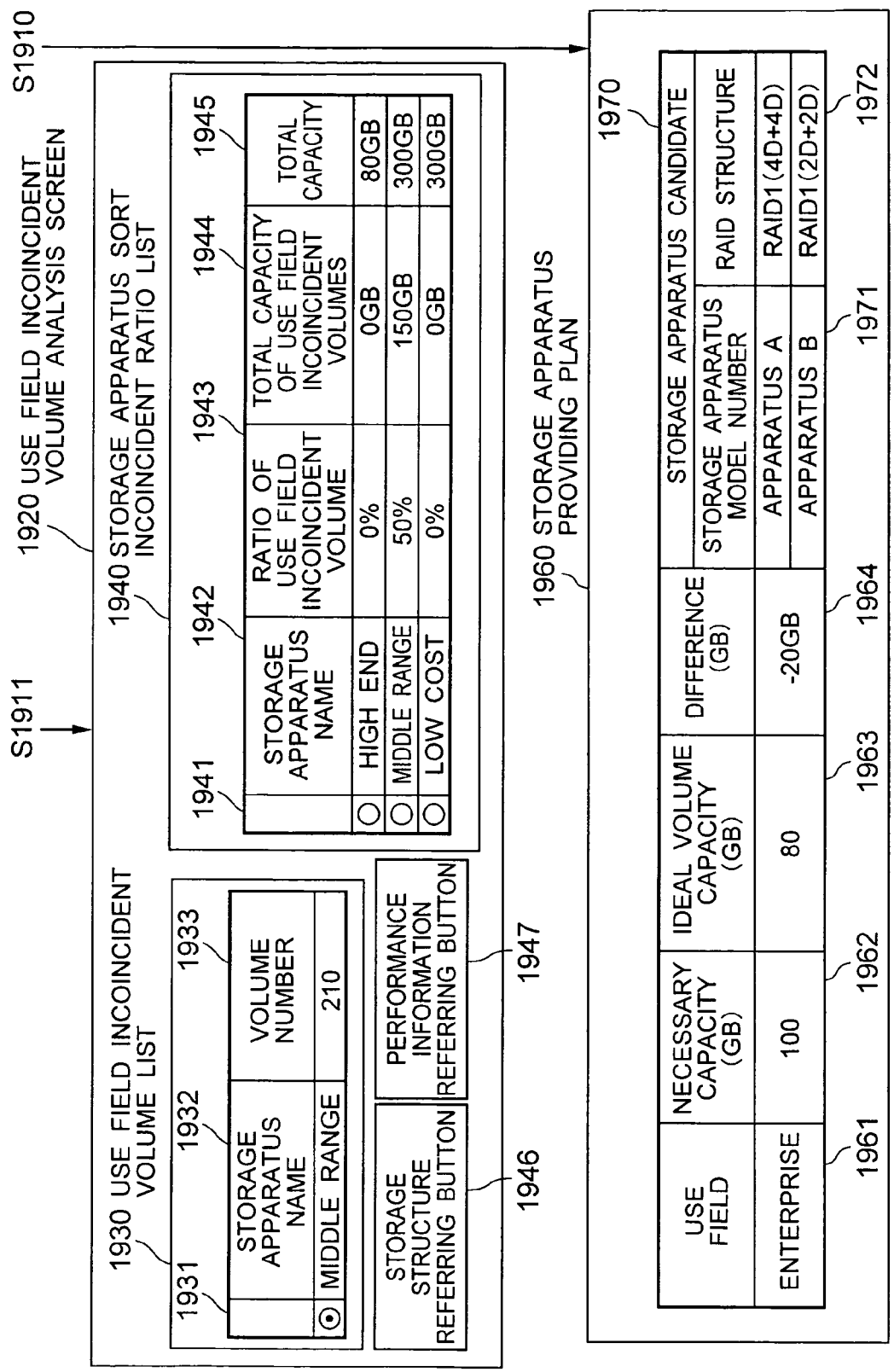
FIG. 25 is a diagram for indicating major structural elements and process flow operations according to the third embodiment.

FIG. 24 and FIG. 25 are diagrams for representing major structural elements and process flow operations in the storage system of the third embodiment. Referring now to FIG. 24 and FIG. 25 (referring properly to FIG. 23), the major storage elements and the process flow operations according to this third embodiment are explained.

A storage resource dividing process operation S130B is realized by that the storage resource dividing program 130B is executed by the processing unit 340. This storage resource dividing process operation S130B contains the use field sort volume allocating sequence S131 and the use field sort storage resource portfolio forming sequence S133, which are explained in the first embodiment, and furthermore, contains both a use field incoincident volume analysis screen outputting sequence S1911 and a storage apparatus providing plan forming sequence S1910.

The use field incoincident volume analysis screen outputting sequence S1911 corresponds to such a sequence that the use field incoincident volume analysis screen 1920 is outputted from the use field sort volume allocation list 500. The storage apparatus providing plane forming sequence S1910 corresponds to such a sequence that the storage apparatus providing plan 1960 is outputted from the use field sort storage resource portfolio 140.

The use field incoincident volume analysis screen 1920 contains a use field incoincident volume list 1930 for displaying a list of volumes which are not suitable for any use fields; a storage apparatus sort incoincident ratio list 1940 for indicating a ratio of the volumes which are not suitable for any use fields in the sort of storage apparatus; a storage structure referring button 1946 for initiating the screen of the storage structure managing program 1950; and a performance information referring button 1947 for initiating the screen of the storage performance information managing program 1951.

The use field incoincident volume list 1930 represents volumes which are not suitable for any use fields as a list, and contains a radio button 1931, a storage apparatus name 1932, and a volume number 1933. The storage apparatus name 1932 indicates a name of a storage apparatus, and the volume number 1933 represents a number for identifying a volume. The radio button 1931 is used to select a volume. After the volume is selected by the radio button 1931, when the storage structure referring button 1946 is depressed, the screen of the storage structure managing program 1950 can be initiated, so that the screen can display as to whether or not structural information and failure information related to the selected volume are present. Similarly, when the performance information referring button 1947 is depressed, the screen of the storage performance information managing program 1951 is initiated, so that performance information related to the selected volume can be displayed thereon.

The storage apparatus sort incoincident ratio list 1940 indicates as a list, ratios of capacities of such volumes which are not suitable for any use fields to total capacities of the storage apparatus, depending upon the sorts of the storage apparatus. This storage apparatus sort incoincident ratio list 1940 contains a radio button 1941, a storage apparatus name 1942, a ratio of use field incoincident volumes 1943, a total capacity of use field incoincident volumes 1944, and a total capacity 1945.

The storage apparatus name 1942 shows a name of a storage apparatus. The ratio of use field incoincident volumes 1943 represents a ratio of the total capacity of the volumes which are not suitable for any use fields with respect to the total capacity of the volumes of the storage apparatus. The total capacity of use field incoincident volumes 1944 indicates a total capacity of such volumes which are not suitable for any use fields. The total capacity 1945 shows a total capacity as to volumes of storage apparatus. The ratio button 1941 is employed so as to select a storage apparatus. Similar to the radio button 1931 of the use field incoincident volume list 1930, after the storage apparatus is selected by the radio button 1941, when the storage structure referring button 1946 is depressed, the screen of the storage structure managing program 1950 can be initiated, so that the screen can display as to whether or not structural information and failure information related to the selected volume are present. Also, when the performance information referring button 1947 is depressed, the screen of the storage performance information managing program 1951 is initiated, so that performance information related to the selected volume can be displayed thereon.

The storage apparatus providing plan 1960 indicates as a list form, candidates for storage apparatus which should be provided in order that a total capacity of volumes suitable for a use field can satisfy a necessary capacity, and contains a use field 1961, a necessary capacity 1962, an ideal volume capacity 1963, a difference 1964, and a storage apparatus candidate 1970.

The use field 1961 indicates a name of a use field; the necessary capacity 1962 represents a necessary capacity of the use field; the ideal volume capacity 1963 shows a total capacity of volumes which are allocated to the use fields whose coincident degree is "ideal"; and the difference 1964 indicates a difference between the ideal volume capacity 1963 and the necessary capacity 1962. The storage apparatus candidate 1970 shows a candidate for a storage apparatus, and is constituted by a storage apparatus model number 1971 and a RAID structure 1972. The storage apparatus model number 1971 represents a model number of a storage apparatus, and the RAID structure 1972 shows a RAID structure of a volume. The reason why the RAID structure 1972 is also displayed is given as follows: That is, a characteristic of a volume is not determined only by a storage apparatus, but such a RAID structure may also give an influence to the characteristic of the volume. Alternatively, a column indicative of other elements (for example, interface of disk, rotation number etc.) which may given influences to the characteristic of the volume may be added to the storage apparatus candidate 1970.

FIG. 26 is a diagram for showing a structure of the storage apparatus characteristic table in the third embodiment. Referring now to FIG. 26 (referring properly to FIG. 23 through FIG. 25), a description is made of the structure of the storage apparatus characteristic table 1900 of this third embodiment.

The storage apparatus characteristic table 1900 describes therein volume characteristics of storage apparatus. As indicated in FIG. 26, the storage apparatus characteristic table 1900 contains a storage apparatus model number 1901, a RAID structure 1902, a capacity unit price 1903, and a response time 1904. The storage apparatus model number 1091 indicates a model number of a storage apparatus, and the RAID structure 1902 shows a structure of RAID. Columns other than the above items (namely, capacity unit price 1903 and response time 1904) correspond to columns indicative of characteristics of volumes having RAID structures indicated by the RAID structure 1902. The capacity unit price 1903 shows a capacity unit price of a volume, and the response time 1904 represents a response time of a volume. If an element other than the RAID structure 1972 which influences the characteristic of the volume has been also added to the storage apparatus candidate 1970 of the storage apparatus providing plan 1960, then the column corresponding to this element is also added to the storage apparatus characteristic table 1900.

Also, in the case that such a volume characteristic other than the capacity unit price and the response time is contained in the use field sort volume profile 100 and the volume characteristic table 120, a volume characteristic contained in the storage characteristic table 1900 is required to be changed in response to this content.

Figure 27:
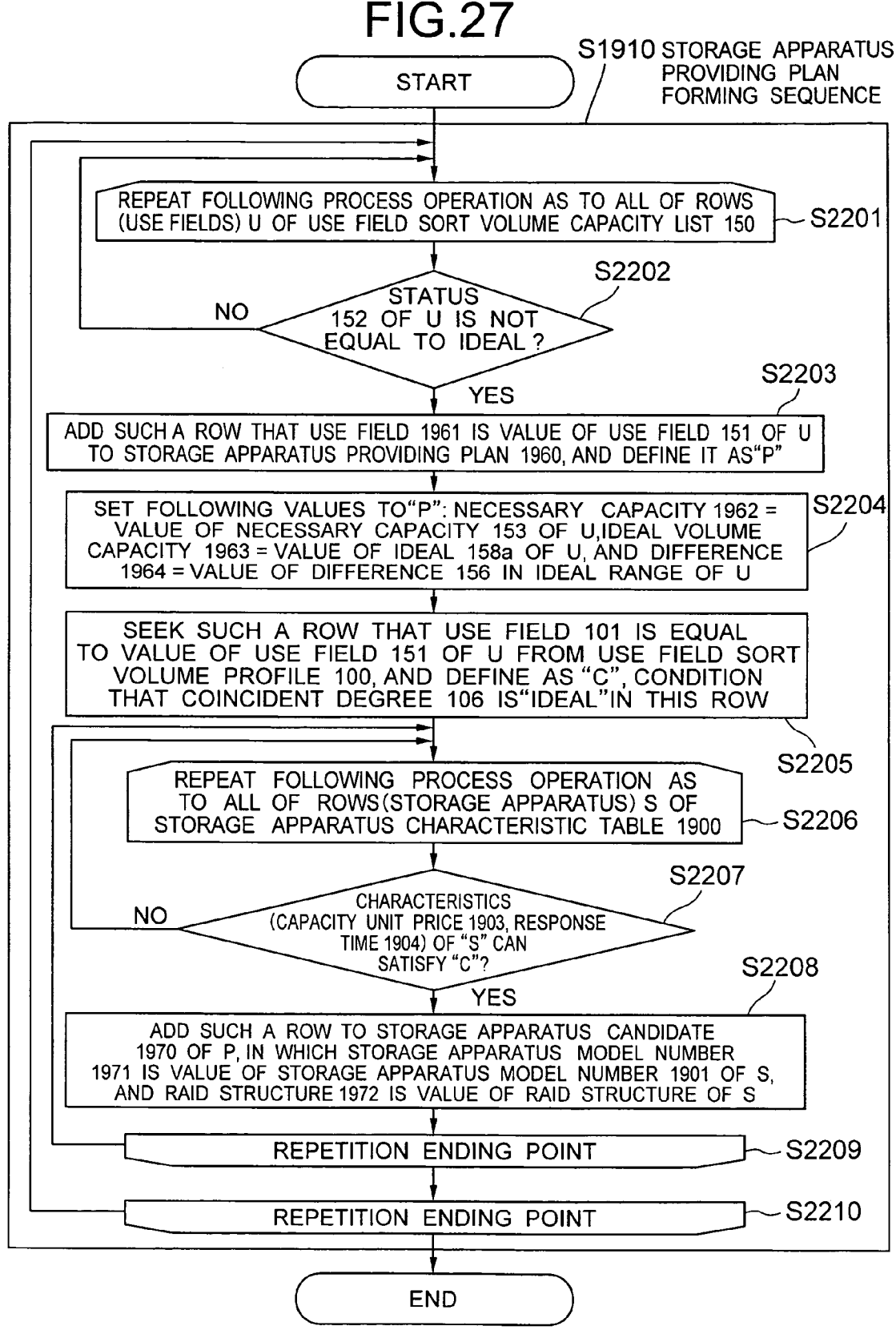
FIG. 27 is a flow chart for explaining sequential flow operations for forming a storage apparatus supplying plan in the third embodiment.

FIG. 27 is a flow chart for describing flow operations as to the storage apparatus providing plan forming sequence S1910 in the third embodiment. Referring now to FIG. 27 (referring properly to FIG. 23 to FIG. 26), the storage apparatus providing plan forming sequence S1910 of this third embodiment will be explained.

Firstly, the processing unit 340 repeatedly performs the below-mentioned process operation as to all of rows (use fields) "U" of the use field sort volume capacity list 160 (step S2201). In this case, the processing unit 340 judges as to whether or not the status 152 of U is different from "ideal" (step S2202). If the status 152 of U is equal to "ideal" ("NO" in step S2202), then the process operation is returned to the step S2201 in which a next repetition process operation is carried. If the status 152 of U is different from "ideal" ("YES" in step S2202), then the processing unit 340 executes steps subsequent to the step S2203.

The processing unit 340 adds such a row that the use field 1961 is the value of the use field 151 of U to the storage apparatus providing plan 1960, and defines this added row as "P" (step S2203). In this case, the below-mentioned value is set to "P." In other words, the processing unit 340 sets the value of the necessary capacity 153 of U to the necessary capacity 1962; sets the value of the ideal 158*a* of U to the ideal volume capacity 1963; and sets the value of the difference 156 within the ideal range of U to the difference 1964 (step S2204). Next, the processing unit 340 seeks such a row that the use field 101 is equal to the value of the use field 151 of U from the use field sort volume profile 100, and then, defines such a condition that the coincident degree 106 is "ideal" in this row as "C" (step S2205).

In this case, the processing unit 340 repeatedly performs the below-mentioned process operation as to all of rows (storage apparatus ) "S" of the storage apparatus characteristic table 1900 (step S2206). The processing unit 340 judges as to whether or not the characteristics (capacitance unit price 1903 and response time 1904) of "S" can satisfy "C" (step S2207). If the characteristics of "S" cannot satisfy "C" ("NO" in step S2207), then the process operation is returned to he step S2206 in which a next repetition process operation is carried out. When the characteristics of "S" can satisfy "C" ("YES" in step S2207), the processing unit 340 adds such a row to the storage apparatus candidate 1970 of "P", in which the storage apparatus model number 1971 is the value of the storage apparatus model number 1901 of "S", and the RAID structure 1972 is the value of the RAID structure 1902 of "S" (step S2208), and then, the process operation is returned to the step S2206 in which a next repetition process operation is carried out. After the repetition process operation defined from the step S2206 to the step S2209 is completed, the process operation is returned to the step S2201 in which a next repetition process operation is carried out. After the repetition process operation defined from the step S2201 to the step S2210 is completed, the processing unit 340 accomplishes the storage apparatus providing plan forming sequence S1910.

Figure 28:
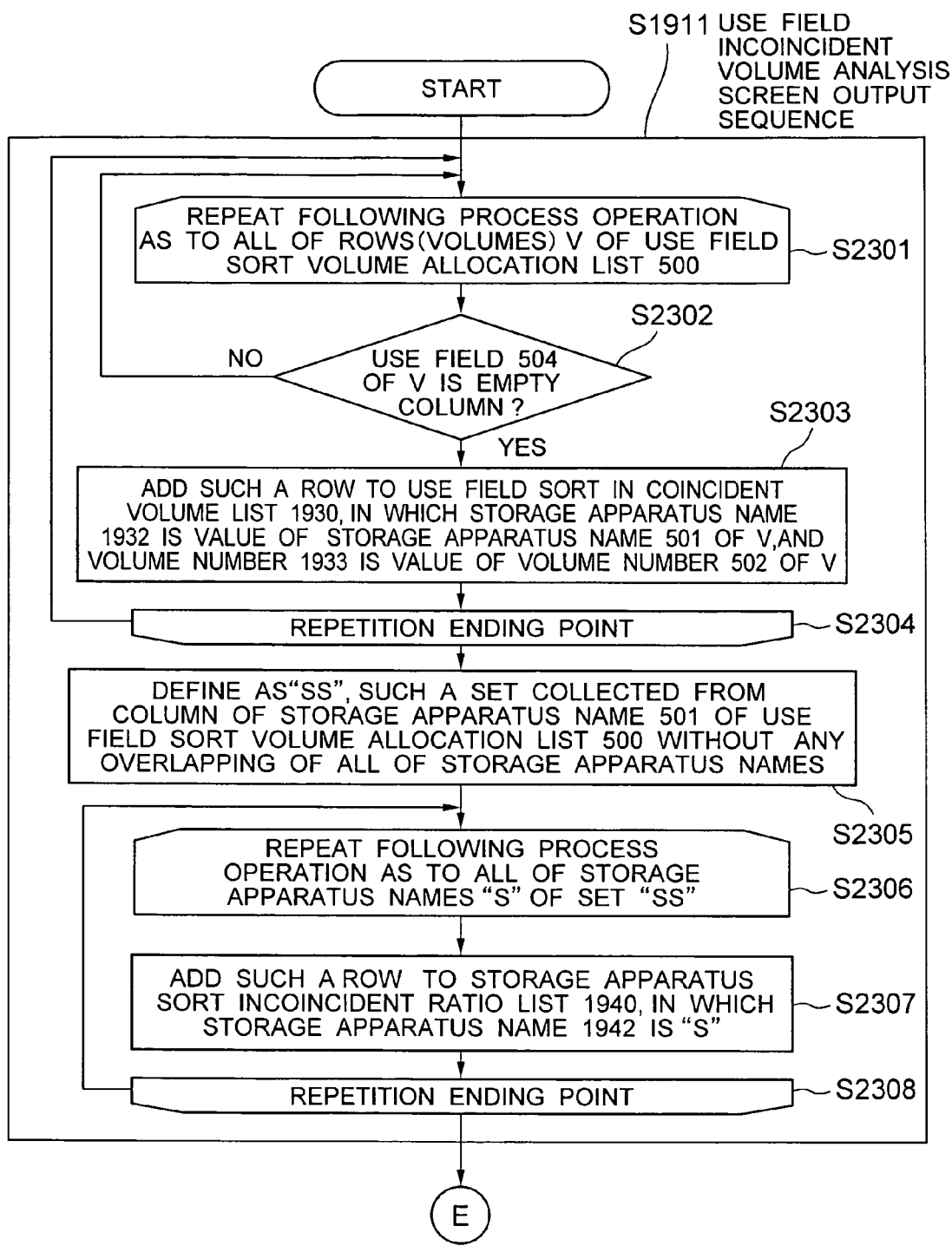
FIG. 28 is a flow chart for describing sequential flow operations for outputting a use field incoincident volume analysis screen in the third embodiment.
Figure 29:
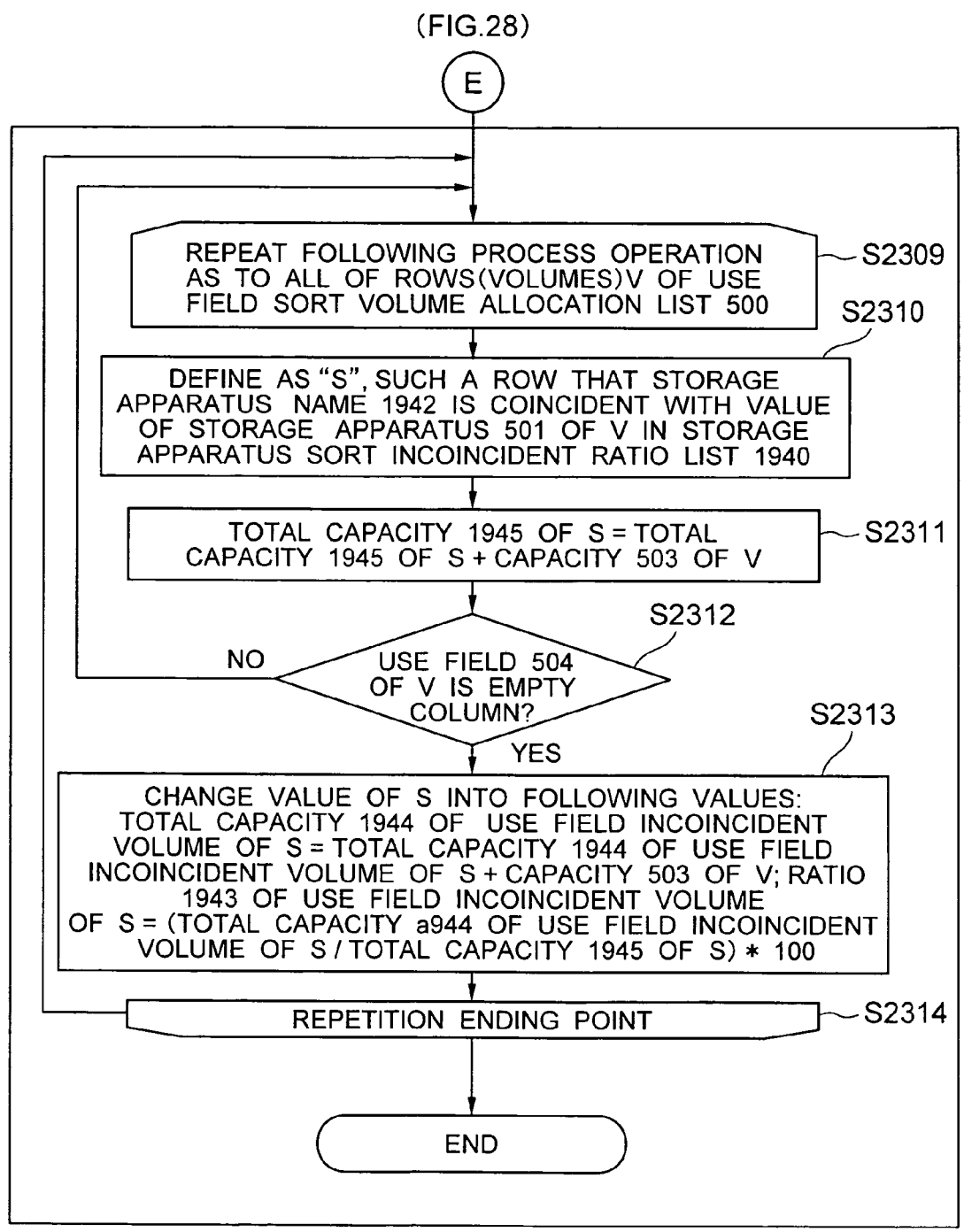
FIG. 29 is a flow chart for describing sequential flow operations for outputting a use field incoincident volume analysis screen in the third embodiment.

FIG. 28 and FIG. 29 are flow charts for representing flow operations as to the use field incoincident volume analysis screen outputting sequence S1911 in the third embodiment. Referring now to FIG. 28 (referring properly to FIG. 23 through FIG. 26), a description is made of the use field incoincident volume analysis screen outputting sequence S1911 of this third embodiment.

Firstly, the processing unit 340 repeatedly performs the below-mentioned process operation as to all of rows (volumes) "V" of the use field sort volume capacity list 150 (step S2301). In this case, the process unit 340 judges as to whether or not the use field 504 of V is an empty column (step S2302). If the use field 504 of V is not the empty column (if use field is allocate) ("NO" in step S2302), the process operation is returned to the step S2301 in which a next repetition process operation is carried out. If the use field 504 of V is the empty column ("YES" in step S2302), the processing unit 340 adds such a row to the use field incoincident volume list 1930, in which the storage apparatus name 1932 is the value of the storage apparatus name 501 of V, and the volume number 1933 is the value of the volume number 502 of V (step S2303), and then, the process operation is returned to the step S2301 in which a next repetition process operation is performed. After the repetition process operation defined from the step S2301 to the step S2304 is ended, the processing unit 340 defines such a set as "SS", in which all of the storage apparatus names are collected from the column of the storage apparatus name 501 of the use field sort volume allocation list 500 without any overlap (step S2305).

Next, the processing unit 340 repeatedly executes the below-mentioned process operation as to all of the storage apparatus names "S" of the set "S2" (step S2306). The processing unit 340 adds such a row that the storage apparatus name 1942 is "S" to the storage apparatus sort incoincident ratio list 1940 (step S2307), and the process operation is returned to the step S2306 in which a next process operation is repeated performed.

After the repetition process operation defined from the step S2306 to the step S2308 is ended, the processing unit 340 repeatedly performs the below-mentioned process operation as to all of rows (volumes) "V" of the use field sort volume capacity list 150 (step S2309). The processing unit 340 defines such a row as "S", in which the storage apparatus name 1942 is coincident with the value of the storage apparatus name 501 of V in the storage apparatus sort incoincident ratio list 1940 (step S2310). The processing unit 340 sets a summation between the total capacity 1945 of "S" and the capacity 503 of "V" to the value of the total capacity 1945 of "S" (step S2311). In this case, the processing unit 340 judges as to whether or not the use field 504 of V is an empty column (step S2312).

If the use field 504 of V is not the empty column (if use field is allocated) ("NO" in step S2312), the process operation is returned to the step S2309 in which a next repetition process operation is carried out. IF the use field 504 of V is the empty column ("YES" in step S2312), then the value of "S" is changed as follows: That is, the processing unit 340 sets a summation between the total capacity 1944 of the use field incoincident volume of S and the capacity 503 of V to the total capacity 1944 of the use field incoincident volume of S, and also, sets such a calculation result of (total capacity 1945 of capacity incoincident volume of S/total capacity 1945 of S)×100 to the use field incoincident volume of S (step S2313). Then, the process operation is returned to the step S2309 in which a next repetition process operation is performed. After the repetition process operation from the step S2309 to the step S2314 is ended, the use field incoincident volume analysis screen outputting sequence S1911 is accomplished.

In accordance with the third embodiment, such a storage apparatus providing plan forming sequence can be provided by which the volume characteristic of the use field whose capacity becomes short is acquired from the use field sort volume profile; the list of the storage apparatus which is coincident with the acquired volume characteristic is acquired from the storage apparatus characteristic table containing the description of the characteristic of the storage apparatus; and then, this list is shown as the storage apparatus providing plan. As a result, in the case that the volume allocated to the use field becomes short, as compared with the necessary capacity, the storage apparatus can be newly conducted in order that the total capacity of the volume suitable for the use field can satisfy the necessary capacity.

Also, there are some possibilities that the volume suitable for the use field becomes short, whereas the volume which is not allocated to any use fields is present, namely the extra volume is present. As a cause that such volumes are produced, it is so conceived that the original performance cannot be achieved due to performance problems and failures. As another cause, the following aspect may be conceived. That is, although the volume were suitable for any of these use fields in the past, the volume is no longer suitable for any use fields due to the change in the use fields, and change in the storage resources. In accordance with the third embodiment, the use field incoincident volume analyzing screen can be provided which owns the list indication of the volumes which are not allocated to any use fields; the means for calling the screen of the storage performance information managing system which manages the storage performance information; and the means for calling the screen of the storage structural managing system which manages the structural information and the failure information of the storages. As a consequence, the cause investigation of such volumes which are not allocated to any use fields can be supported.

Also, on this use field incoincident volume analysis screen, the storage apparatus incoincident ratio list is also displayed by which the ratio of such volumes are shown, depending upon the storage apparatus sort. As a result, such a plan can be supported in order to improve the cost required for the storage system, by which such a storage apparatus is discarded that the ratio of the volumes which are not allocated to any use fields is large, and also, is replaced by another storage apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage resource management system including a storage apparatus having one or more pieces of a plurality of volumes and a management computer connectable with said storage apparatus via a network; wherein:

said management computer comprises a storage unit for storing thereinto both volume characteristic information in which identification information of a volume of said plurality of volumes corresponds to a characteristic value of said volume, and use field sort volume information in which a use field of said volume corresponds to a condition of a characteristic value of a volume suitable for said use field, wherein said management computer acquires the characteristic value of said volume from said volume characteristic information based upon the identification information of said volume, said management computer acquires the use field of said volume in which said acquired characteristic value of said volume satisfies the condition of the characteristic value of the volume suitable for said use field from said use field sort volume information, and in the case that the acquired use field of said volume is a single use field, said management computer stores said single use field and the identification information of said volume in correspondence with each other into said storage unit; and wherein said management computer is further comprises a processing unit by which when the acquired use fields of said volume are plural use fields, said processing unit selects one use field from said plural use fields, and stores said selected one use field and the identification information of said volume in correspondence with each other in said storage unit.

2. A storage resource managing method in a storage system including a storage apparatus having one or more pieces of a plurality of volumes and a management computer connectable with said storage apparatus via a network, in which said management computer is comprised of a processing unit for processing information, and a storage unit for storing thereinto information, and said storage unit stores thereinto both volume characteristic information in which identification information of a volume of said plurality of volumes corresponds to a characteristic value of said volume, and use field sort volume information in which a use field of said volume corresponds to a condition of a characteristic value of a volume suitable for said the field, wherein:

said processing unit acquires the characteristic value of said volume from said volume characteristic information based upon the identification information of said volume;

said processing unit acquires the use field of said volume in which said acquired characteristic value of said volume satisfies the condition of the characteristic value of the volume suitable for said use field from said use field sort volume information;

in the case that the acquired use field of said volume is a single use field, said processing unit stores said single use field and the identification information of said volume in correspondence with each other into said storage unit; and when the acquired use fields of said volume are plural use fields, said processing unit selects one use field from said plural use fields, and stores said selected one use field and the identification information of said volume in correspondence with each other in said storage unit.

3. A storage resource managing method as claimed in claim 2, wherein said storage unit stores thereinto a plurality of conditions of characteristic values of the volumes suitable for said use fields with respect to the use fields of the respective volumes, depending upon coincident degrees when the volumes are allocated to the use fields; and wherein:

said processing unit further acquires said coincident degree when the use field of said volume is acquired from said use field sort volume information; and said processing unit stores said coincident degree into said storage unit in addition to said use field and the identification information of said volume in correspondence with said coincident degree.

4. A storage resource managing method as claimed in claim 2, wherein said storage unit stores thereinto a plurality of priority degrees as said use field sort volume information in correspondence with the use field of said volume; and wherein:

when said processing unit selects one use field from said plurality of use fields, said processing unit selects a use field having the highest priority degree.

5. A storage resource managing method as claimed in claim 2, wherein said storage unit stores thereinto allocated capacities for use field sorts, and further stores thereinto necessary capacities as said use field sort volume information in correspondence with the use fields of said volumes; and wherein:

when said processing unit acquires the use field of said volume from said use field sort volume information, said processing unit acquires the use field of said volume in the case that said use field sort allocated capacity is smaller than said necessary capacity.

6. A storage resource managing method as claimed in claim 5, wherein said storage unit stores thereinto capacities of said volumes as said volume characteristic information in correspondence with the identification information of said volumes; and wherein:

when said use fields and the identification information of said volumes are stored in said storage unit in correspondence with each other, said processing unit adds the capacities of said volumes to the allocated capacities of said use field sort.

7. A storage resource managing method as claimed in claim 2, wherein said storage unit further stores thereinto a use field sort volume allocating policy containing a policy related to a processing sequence policy; and wherein:

said processing unit changes the processing sequence in accordance with said use field sort volume allocating policy.

8. A storage resource managing method as claimed in claim 2, wherein after said use field sort volume allocation policy is stored in said storage unit, said processing unit calculates a total capacity of the volumes which are allocated to said use field by employing said use field sort volume allocation information, and stores into said storage unit, said use field sort volume capacity information in which said total capacity corresponds to said use fields.

9. A storage resource managing method as claimed in claim 2, wherein after said use field sort volume allocation information is stored in said storage unit, said processing unit calculates a total capacity of the volumes which are not allocated to said use field by employing said use field sort volume allocation information, and stores into said storage unit, said extra volume capacity information in which said total capacity corresponds to said use fields.

10. A storage resource managing method as claimed in claim 2, wherein after said use field sort volume allocation information is stored in said storage unit, said processing unit calculates a total capacity of the volumes which are not allocated to said use field by employing said use field sort volume allocation information, depending upon a coincident degree sort, and stores into said storage unit, said use field sort volume capacity information in which said total capacity corresponds to said use fields, depending upon said coincident degree sort.

11. A storage resource managing method as claimed in claim 2, wherein after said use field sort volume allocation information is stored in said storage unit, said processing unit forms a condition statement used to retrieve a volume which is allocated to said use field by employing said use field sort volume allocation information, and stores storage group definition information in which said condition statement corresponds to said use field into said storage unit.

12. A storage resource managing method as claimed in claim 2, wherein said processing unit further stores thereinto old use field sort volume allocation information in which said use field corresponds to the identification information of said volume, and wherein:

after said use field sort volume allocation information is stored in said storage unit, said processing unit compares said volume identification information of said use field sort volume allocation information with said volume identification information of said old use field sort volume allocation information;

in the case that two pieces of said volume identification information are coincident with each other and volumes whose use fields are different from each other are present, said processing unit retrieves said use field sort volume allocation information based upon said use fields of said old use field sort volume allocation information; and said processing unit stores into said storage unit, rearrangement information in which the identification information of said volume acquired in said retrieving operation corresponds to the identification information of said volume of said old use field sort volume allocation information.

13. A storage resource managing method as claimed in claim 2, wherein after said use field sort volume allocation information is stored in said storage unit, said processing unit acquires the identification information of said volume in which the corresponding use field is not present from said use field sort volume allocation information, and then, stores the acquired identification information into said storage unit.

14. A storage resource managing method as claimed in claim 8, wherein said storage unit stores thereinto a necessary capacity as said use field sort volume information in correspondence with the use field of said volume, and further stores thereinto storage apparatus characteristic information in which identification information of a storage apparatus to be provided corresponds to the characteristic information of said storage apparatus; and wherein:

as to such a use field that said total capacity of said use field sort volume capacity information is smaller than said necessary capacity, said processing unit acquires a condition of a characteristic value of a volume suitable for said use field from said use field sort volume information; and said processing unit acquires identification information of said storage apparatus which is coincident with the condition of said characteristic value of said volume from said storage apparatus characteristic information, and then, stores the acquired identification information into said storage unit in correspondence with said use field.

15. A management computer used in a storage system including a storage apparatus having one or more pieces of a plurality of volumes and a management computer connectable with said storage apparatus via a network, wherein said management computer comprises a storage unit for storing thereinto both volume characteristic information in which identification information of a volume of said plurality of volumes corresponds to a characteristic value of said volume, and use field sort volume information in which a use field of said volume corresponds to a condition of a characteristic value of a volume suitable for said use field;

said management computer acquires the characteristic value of said volume from said volume characteristic information based upon the identification information of said volume;

said management computer acquires the use field of said volume in which said acquired characteristic value of said volume satisfies the condition of the characteristic value of the volume suitable for said use field from said use field sort volume information;

in the case that the acquired use field of said volume is a single use field, said management computer stores use field sort volume allocation information in which said use field corresponds to the identification information of said volume into said storage unit; and said management computer is further comprised of:

a processing unit by which when the acquired use fields of said volume are plural use fields, said processing unit selects one use field from said plural use fields, and stores use field sort volume allocation information in which said selected use field corresponds to the identification information of said volume into said storage unit.

16. A management computer as claimed in claim 15, wherein after said use field sort volume allocation information is stored in said storage unit, said processing unit calculates a total capacity of the volumes which are allocated to said use field by employing said use field sort volume allocation information, and stores into said storage unit, said use field sort volume capacity information in which said total capacity corresponds to said use fields.

17. A management computer as claimed in claim 16,wherein said storage unit stores thereinto a necessary capacity as said use field sort volume information in correspondence with the use field of said volume, and further stores thereinto storage apparatus characteristic information in which identification information of a storage apparatus to be provided corresponds to the characteristic information of said storage apparatus, nd wherein:

as to such a use field that said total capacity of said use field sort volume capacity information is smaller than said necessary capacity, said processing unit acquires a condition of a characteristic value of a volume suitable for said use field from said use field sort volume information; and said processing unit acquires identification information of said storage apparatus which is coincident with the condition of said characteristic value of said volume from said storage apparatus characteristic information, and then, stores the acquired identification information into said storage unit in correspondence with said use field.

18. A storage resource managing method in a storage system including a storage apparatus having one or more pieces of a plurality of volumes and a storage management server connected with said storage apparatus via a network, in which:

said storage management server comprises: a processing unit for processing information, and a storage unit for storing thereinto information; and said storage unit stores thereinto both a volume characteristic table in which identification information of a volume of said plurality of volumes, a characteristic value of said volume, and a capacity of said volume correspond to each other, and stores a use field sort volume profile in which a use field of said volume, a condition of a characteristic value of a volume suitable for said use field, and a priority degree thereof correspond to each other; wherein:

said processing unit acquires a first use field up to an N-th use field by executing:

a process operation for acquiring the characteristic value of said volume from said volume characteristic information based upon the identification information of said volume; and a process operation for acquiring the use field of said volume in which said acquired characteristic value of said volume satisfies the condition of the characteristic value of the volume suitable for said use field from said use field sort volume profile with respect to identification information of a first volume up to identification information of an N-th volume;

in such a case that said first use field through said N-th use field are identical to each other as a set, said processing unit acquires capacities of said volumes respectively from said volume characteristic table based upon such information defined from the identification information of said first volume up to the identification information of said N-th volume so as to calculate a total value of said acquired capacities;

said processing unit calculates an equi-divided capacity corresponding to such a capacity of a volume which can be allocated to each of the use fields by dividing said total value by a number of use fields which constitute said first use field;

said processing unit selects such a use field having a highest priority degree from said first use field until the divided capacity is reached to the equi-divided capacity, and stores use field sort volume allocation information in which said use field corresponds to identification information of said volume into said storage unit; and when said divided capacity is reached to said equi-divided capacity, said processing unit selects such a use field having a priority degree lower than said highest priority degree by 1 degree from said first use field, and stores use field sort volume allocation information in which said use field corresponds to identification information of said volume into said storage unit.

* * * * *